(12) United States Patent
Peringassery Krishnan et al.

(10) Patent No.: US 12,096,030 B2
(45) Date of Patent: Sep. 17, 2024

(54) METHOD AND APPARATUS FOR VIDEO CODING

(71) Applicant: Tencent America LLC, Palo Alto, CA (US)

(72) Inventors: Madhu Peringassery Krishnan, Mountain View, CA (US); Samruddhi Yashwant Kahu, Palo Alto, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 463 days.

(21) Appl. No.: 17/490,967

(22) Filed: Sep. 30, 2021

(65) Prior Publication Data

US 2022/0201334 A1 Jun. 23, 2022

Related U.S. Application Data

(60) Provisional application No. 63/130,249, filed on Dec. 23, 2020.

(51) Int. Cl.
*H04N 7/12* (2006.01)
*H04N 19/103* (2014.01)
(Continued)

(52) U.S. Cl.
CPC ........... *H04N 19/61* (2014.11); *H04N 19/103* (2014.11); *H04N 19/12* (2014.11); *H04N 19/132* (2014.11);
(Continued)

(58) Field of Classification Search
CPC .................................................... H04N 19/12
See application file for complete search history.

(56) References Cited

U.S. PATENT DOCUMENTS

| | | |
|---|---|---|
| 2018/0091817 A1 | 3/2018 | Sole et al. |
| 2019/0166370 A1 | 5/2019 | Xiu et al. |
| 2020/0322611 A1 | 10/2020 | Salehifar et al. |

FOREIGN PATENT DOCUMENTS

| | | |
|---|---|---|
| JP | 2019534624 A | 11/2019 |
| WO | 2019185883 A1 | 10/2019 |

OTHER PUBLICATIONS

International Search Report and Written Opinion issued Jan. 11, 2022 in PCT/US 21/53591, 9 pages.

(Continued)

*Primary Examiner* — Young Lee
(74) *Attorney, Agent, or Firm* — ArentFox Schiff LLP

(57) ABSTRACT

Aspects of the disclosure provide a method and an apparatus including processing circuitry for video decoding. The processing circuitry determines a transform candidate for a block in a current picture from a group of transform sets based on one of a feature vector $\vec{F}$ or a feature scalar S extracted from reconstructed samples in one or more neighboring blocks of the block. Each transform set of the group of transform sets can include one or more transform candidates for the block. The one or more neighboring blocks can be in the current picture or a reconstructed picture different from the current picture. The processing circuitry reconstructs samples of the block based on the determined transform candidate. The processing circuitry can select a sub-group of transform sets from the group of transform sets based on a prediction mode for the block indicated in coded information for the block and determine the transform candidate from the sub-group of transform sets based on the reconstructed samples.

18 Claims, 22 Drawing Sheets

(51) Int. Cl.
    *H04N 19/12*     (2014.01)
    *H04N 19/132*     (2014.01)
    *H04N 19/137*     (2014.01)
    *H04N 19/172*     (2014.01)
    *H04N 19/176*     (2014.01)
    *H04N 19/61*     (2014.01)

(52) U.S. Cl.
    CPC ......... *H04N 19/137* (2014.11); *H04N 19/172* (2014.11); *H04N 19/176* (2014.11)

(56) References Cited

OTHER PUBLICATIONS

Japanese Office Action issued in Application No. 2022-557969, mailed Oct. 23, 2023, 23 pages.
Supplementary European Search Report issued in Application No. 21911820.5, mailed Feb. 2, 2023, 8 pages.
Peter de Rivaz et al., AV1 Bitstream & Decoding Process Specification, Jan. 18, 2019. (681 pages).
Benjamin Bross et al., General Video Coding Technology in Responses to the Joint Call for Proposals on Video Compression with Capability beyond HEVC; IEEE Transactions on Circuits and Systems for Video Technology, 2019. (16 pages).
Yao-Jen Chang et al., Intra prediction using multiple reference lines for the versatile video coding standard, 2019, 8 pages.
Zhaobin Zhang et al., Fast Adaptive Multiple Transform for Versatile Video Coding, 2019 Data Compression Conference (DCC), IEEE 2019, pp. 63-72 (10 pages).
Zhaobin Zhang et al., Fast DST-7/DCT-8 with Dual Implementation Support for Versatile Video Coding, IEEE Transactions on Circuits and Systems for Video Technology, 2020, 17 pages.
Xin Zhao et al., Novel Statistical Modeling, Analysis and Implementation of Rate-Distortion Estimation for H.264/AVC Coders, IEEE Transactions on Circuits and Systems for Video Technology, vol. 20, No. 5, May 2010, pp. 647-660 (14 pages).
Xin Zhao et al., NSST: Non-Separable Secondary Transforms for Next Generation Video Coding, IEEE, 2016, 5 pages.
Xin Zhao et al., Low-Complexity Intra Prediction Refinements for Video Coding, IEEE, PCS 2018, pp. 139-143 (5 pages).
Xin Zhao et al., Joint Separable and Non-Separable Transforms for Next-Generation Video Coding, IEEE Transactions on Image Processing, 2018, 13 pages.
Xin Zhao et al., Coupled Primary and Secondary Transform for Next Generation Video Coding, IEEE, 2018, 4 pages.
Liang Zhao et al., Wide Angular Intra Prediction for Versatile Video Coding, Data Compression Conference (DCC), IEEE, 2019, pp. 53-62 (10 pages).
Benjamin Bross et al., Versatile Video Coding (Draft 2), Document: JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018, 140 pages.
Benjamin Bross et al., Versatile Video Coding (Draft 6), Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.
Fabien Racapé et al., CE3-related: Wide-angle intra prediction for non-square blocks, JVET-K0500, 10 pages.
Fabien Racapé et al., CE3-related: Wide-angle intra prediction for non-square blocks, JVET-K0500_r1, 7 pages.
Fabien Racapé et al., CE3-related: Wide-angle intra prediction for non-square blocks, JVET-K0500_r2, 7 pages.
Fabien Racapé et al., CE3-related: Wide-angle intra prediction for non-square blocks, JVET-K0500_r3, 12 pages.
Fabien Racapé et al., CE3-related: Wide-angle intra prediction for non-square blocks, JVET-K0500_r4, 13 pages.
Appendix H, JVET-K0500-BMS (2 pages).
Appendix I, JVET-K0500-VTM (2 pages).
Appendix J, JVET-K0500-VTM-NoBF (2 pages).
Appendix K, JVET-L0283_CE3-1.1.1-VTM (3 pages).
Appendix L, JVET-L0283_CE3-1.1.2-VTM (3 pages).
Appendix M, JVET-L0283_CE3-1.1.3_C1-VTM (3 pages).
Appendix N, JVET-L0283_CE3-1.1.3_C2-VTM (3 pages).
Appendix O, JVET-L0283_CE3-1.1.3_C3-VTM (3 pages).
Appendix P, JVET-L0283_CE3-1.1.3-VTM (3 pages).
Appendix Q, JVET-L0283_CE3-1.1.4-VTM (3 pages).
Benjamin Bross et al., CE3: Multiple reference line intra prediction (Test 1.1.1, 1.1.2, 1.1.3 and 1.1.4), Document:JVET-L0283-v2, 7 pages.
Benjamin Bross et al., Versatile Video Coding (Draft 2), Document: JVET-K1001-v6, 141 pages.
Xin Zhao et al., CE6: On 8-bit primary transform core (Test 6.1.3), Document: JVET-L0285, 17 pages.
Appendix R, JVET-L0285_CE6-1.3a (2 pages).
Appendix S, JVET-L0285_CE6-1.3b (2 pages).
Appendix T, JVET-L0285_CE6-1.3b_LowQP (2 pages).
Appendix U, JVET-L0285_CE6-1.3a_LowQP (2 pages).
Xin Zhao et al., CE6: On 8-bit primary transform core (Test 6.1.3), Document: JVET-L0285-r1, 17 pages.
Xin Zhao et al., CE6: Fast DST-7/DCT-8 with dual implementation support (Test 6.2.3), Document: JVET-M0497, 11 pages.
Appendix V, JVET-M0497-CE6-2-3a (2 pages).
Appendix W, JVET-M0497-CE6-2-3a_LowQP (2 pages).
Xin Zhao et al., CE6-related: Unified LFNST using block size independent kernel, Document: JVET-O0539-v2, 13 pages.
Appendix X, JVET-O0539-vs-CE6-2.1a (2 pages).
Appendix Y, JVET-O0539-vs-CE6-2.1a-LowQP (2 pages).
Appendix Z, JVET-O0539-vs-CE6-2.1b (2 pages).
Appendix AA, JVET-O0539-vs-CE6-2.1b-LowQP (2 pages).
Appendix AB, JVET-O0539-vs-VTM5_r1 (2 pages).
Appendix AC, JVET-O0539-vs-VTM5-LowQP_r1 (2 pages).
Appendix AD, JVET-O0545_Log2MaxTbSize=4 (3 pages).
Appendix AE, JVET-O0545_Log2MaxTbSize=5 (2 pages).
Appendix AF, JVET-O0545_Log2MaxTbSize=6 (2 pages).
Xin Zhao et al., Non-CE6: Configurable max transform size in VVC, Document: JVET-O0545-v2, 6 pages.

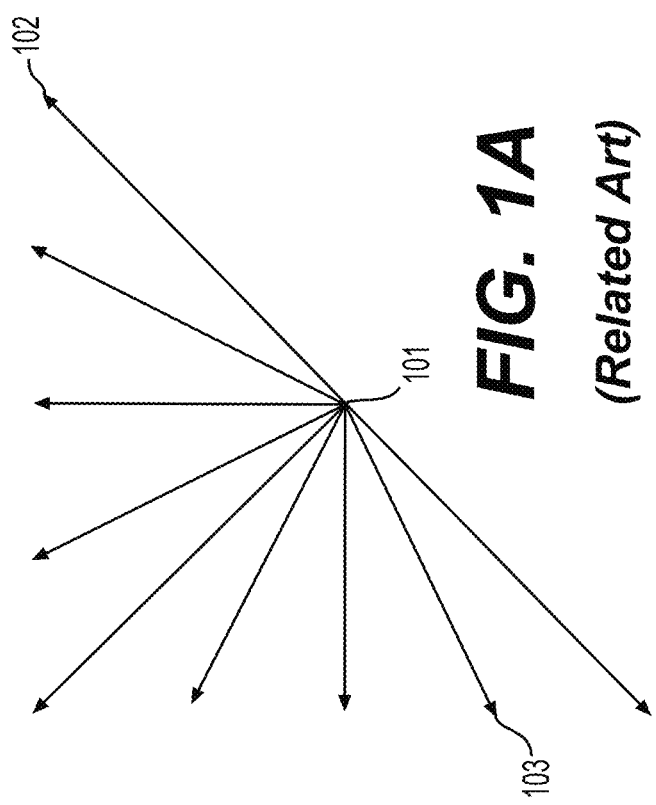
FIG. 1A *(Related Art)*

| Transform Type | Basis function $T_i(j)$, $i,j=0, 1,\ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ <br> where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 13

| Transform Types | Description | Prediction mode | |
| --- | --- | --- | --- |
| | | Intra | Inter |
| DCT_DCT | DCT ↓ and → | ✓ (all block sizes) | ✓ (all block sizes) |
| ADST_DCT | ADST ↓; DCT → | ✓<br>(block size ≤ 16×16) | ✓<br>(block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓<br>(block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓<br>(block size ≤ 16×16) | ✓<br>(block size ≤ 32×32) |
| V_DCT | DCT ↓; IDTX → | ✓<br>(block size < 16×16) | ✓<br>(block size ≤ 16×16) |
| H_DCT | IDTX ↓; DCT → | | |
| V_ADST | ADST ↓; IDTX → | ✗ | ✓<br>(block size < 16×16) |
| H_ADST | IDTX ↓; ADST → | | |
| V_FLIPADST | FLIPADST ↓; IDTX → | ✗ | ✓<br>(block size < 16×16) |
| H_FLIPADST | IDTX ↓; FLIPADST → | | |

FIG. 14A

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 14B

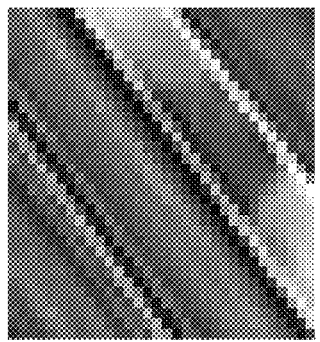
FIG. 17A
FIG. 17B
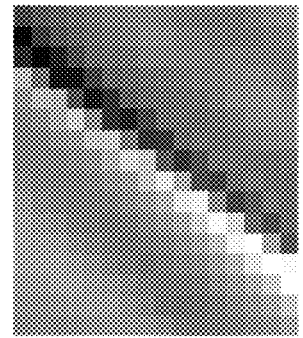
FIG. 17C
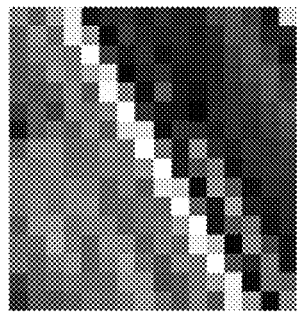
FIG. 17D

METHOD AND APPARATUS FOR VIDEO CODING

INCORPORATION BY REFERENCE

This disclosure claims the benefit of priority to U.S. Provisional Application No. 63/130,249, entitled "Feature based transform selection" that is filed on Dec. 23, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can determine a transform candidate for a block in a current picture from a group of transform sets based on one of a feature vector $\vec{F}$ or a feature scalar S extracted from reconstructed samples in one or more neighboring blocks of the block. Each transform set of the group of transform sets can include one or more transform candidates for the block. The one or more neighboring blocks can be in the current picture or a reconstructed picture that is different from the current picture. The processing circuitry can reconstruct samples of the block based on the determined transform candidate.

In an embodiment, a sub-group of transform sets can be selected from the group of transform sets based on a prediction mode for the block indicated in coded information for the block. The transform candidate can be determined from the sub-group of transform sets based on the one of the feature vector $\vec{F}$ or the feature scalar S extracted from the reconstructed samples in the one or more neighboring blocks of the block.

In an example, one transform set of the sub-group of transform sets is selected based on the one of the feature vector $\vec{F}$ or the feature scalar S extracted from the reconstructed samples in the one or more neighboring blocks of the block. The transform candidate for the block can be determined from the selected one transform set of the sub-group of transform sets based on an index signaled in the coded information.

In an example, one transform set of the sub-group of transform sets is selected based on an index signaled in the coded information. The transform candidate for the block can be determined from the selected one transform set of the sub-group of transform sets based on the one of the feature vector $\vec{F}$ or the feature scalar S extracted from the reconstructed samples in the one or more neighboring blocks of the block.

In an example, the transform candidate can be implicitly determined from the sub-group of transform sets based on the one of the feature vector $\vec{F}$ or the feature scalar S extracted from the reconstructed samples in the one or more neighboring blocks of the block.

In an example, the one of the feature vector $\vec{F}$ or the feature scalar S is determined based on a statistical analysis of the reconstructed samples in the one or more neighboring blocks of the block. A sub-group of transform sets can be selected from the group of transform sets based on a prediction mode for the block indicated in coded information for the block. The processing circuitry can perform one of (i) determining a transform set from the sub-group of transform sets based on the one of the feature vector $\vec{F}$ or the feature scalar S, (ii) determining the transform candidate from the sub-group of transform sets based on the one of the feature vector $\vec{F}$ or the feature scalar S, or (iii) selecting the transform set from the sub-group of transform sets based on an index in the coded information and determining the transform candidate from the selected transform set based on the one of the feature vector $\vec{F}$ or the feature scalar S.

In an example, the one of the feature vector $\vec{F}$ or the feature scalar S is the feature scalar S. The feature scalar S is determined as a moment of a variable that indicates sample values of the reconstructed samples in the one or more neighboring blocks of the block.

In an example, a set of thresholds $K_s$ are pre-defined. The processing circuitry performs one of (i) determining the transform set from the sub-group of transform sets based on the moment of the variable and a threshold from the set of thresholds $K_s$, (ii) determining the transform candidate from the sub-group of transform sets based on the moment of the variable and the threshold, or (iii) selecting the transform set from the sub-group of transform sets based on the index in the coded information and determining the transform candidate from the selected transform set based on the moment of the variable and the threshold.

In an example, the moment of the variable is one of a first moment of the variable, a second moment of the variable, or a third moment of the variable. The prediction mode for the block is one of multiple prediction modes. Each of the multiple prediction modes corresponds to a unique subset of thresholds $K_s'$ that is in the set of thresholds $K_s$ indicating an injective mapping between the multiple prediction modes and multiple subsets of thresholds that are in the set of thresholds $K_s$.

In an example, the processing circuitry selects the threshold from the set of thresholds $K_s$ based on one of (i) a block size of the block, (ii) a quantization parameter, or (iii) the prediction mode for the block.

In an example, the one of the feature vector $\vec{F}$ or the feature scalar S is the feature vector $\vec{F}$. The feature vector $\vec{F}$ is determined as a joint variability of variables that respectively indicate sample values of reconstructed samples of a neighboring column on a left side of the block and sample values of reconstructed samples of a neighboring row on a top side of the block.

In an example, a set of classification vectors $\vec{C}$ and a set of thresholds Kv that is associated with the set of classification vectors $\vec{C}$ are pre-defined. The processing circuitry calculates a distance between the joint variability of the variables and a classification vector selected from a subset of classification vectors $\vec{C'}$ included in the set of classification vectors $\vec{C}$. The processing circuitry performs one of (i) determining the transform set from the sub-group of transform sets based on a comparison of the distance and a threshold selected from a subset of thresholds $K_v'$ included in the set of thresholds $K_v$, (ii) determining the transform candidate from the sub-group of transform sets based on the comparison of the distance and the threshold, or (iii) selecting the transform set from the sub-group of transform sets based on the index in the coded information and determining the transform candidate from the selected transform set based on the comparison of the distance and the threshold.

Aspects of the disclosure also provide non-transitory computer-readable mediums storing instructions which when executed by a computer for video decoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIG. 13 shows examples of primary transform basis functions according to embodiments of the disclosure.

FIG. 14A shows exemplary dependencies of availability of various transform kernels based on a transform block size and a prediction mode according to embodiments of the disclosure.

FIG. 14B shows exemplary transform type selections based on an intra prediction mode according to embodiments of the disclosure.

FIGS. 17A-17D show exemplary residual patterns (in grayscale) observed for an intra prediction mode according to an embodiment of the disclosure.

DETAILED DESCRIPTION OF EMBODIMENTS

Figure 1B:
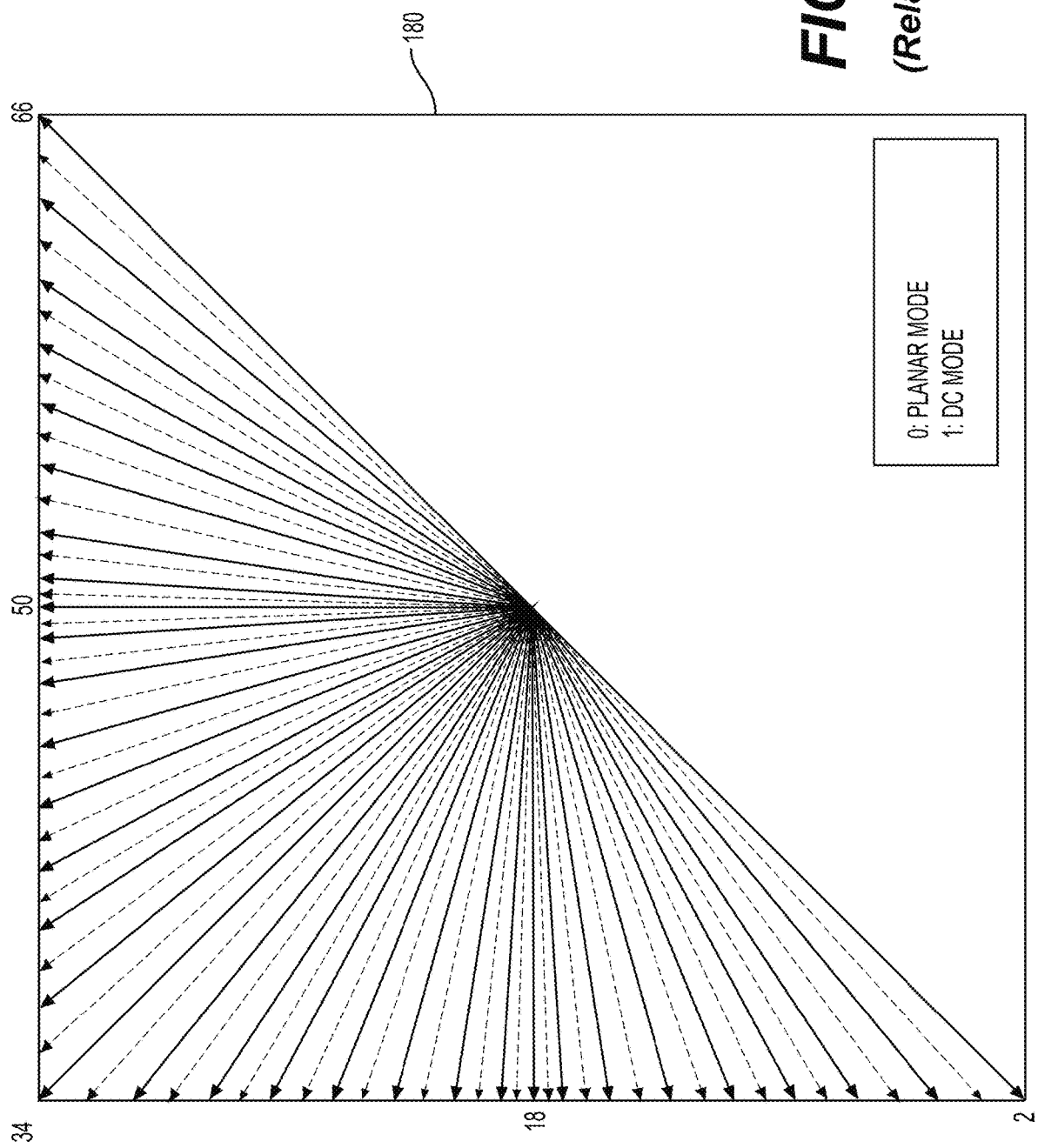
FIG. 1B is an illustration of exemplary intra prediction directions.
Figure 2:
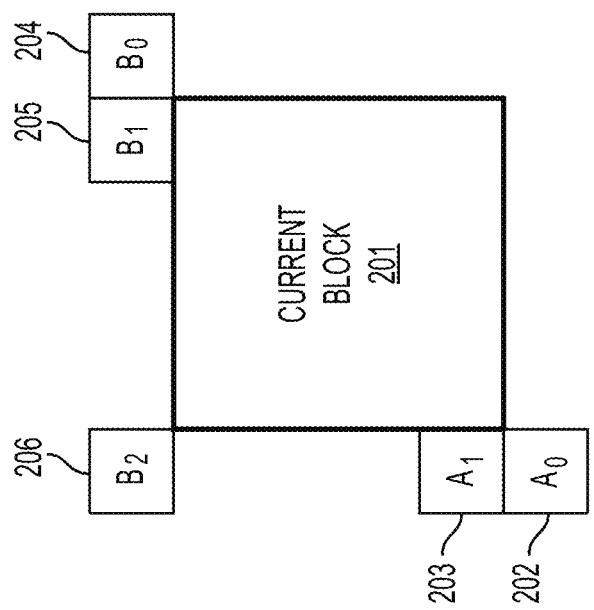
FIG. 2 is a schematic illustration of a current block and its surrounding spatial merge candidates in one example.
Figure 3:
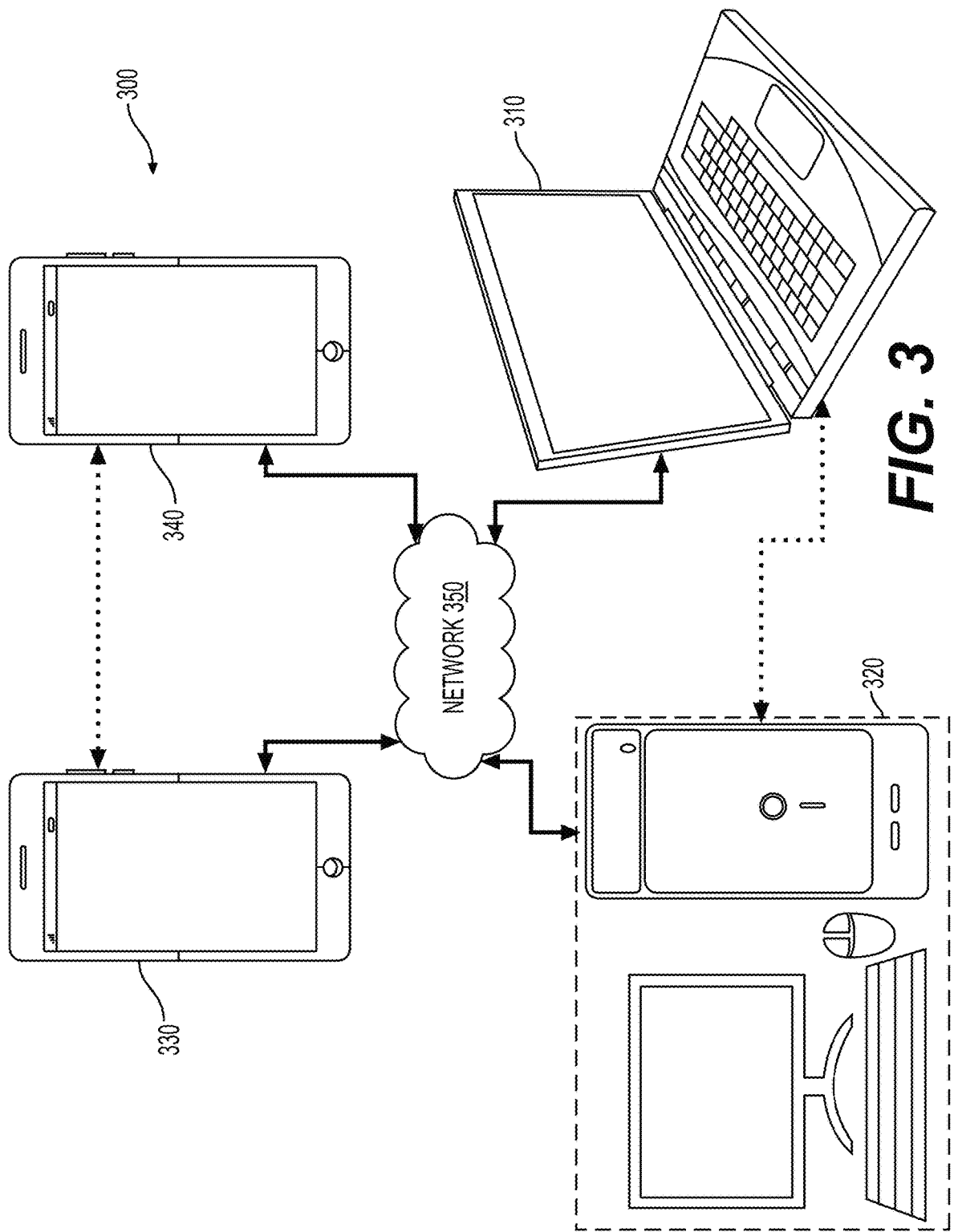
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
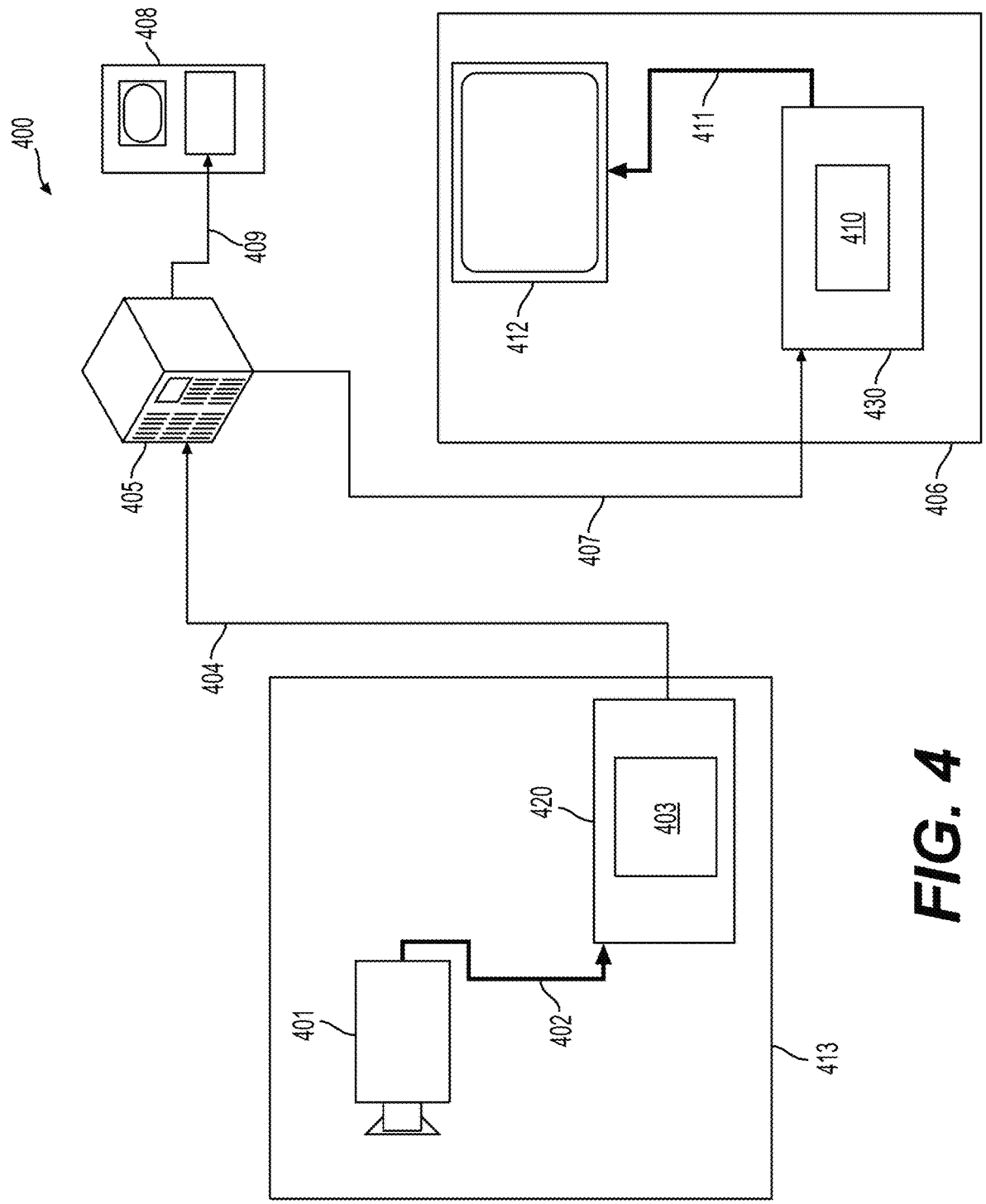
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
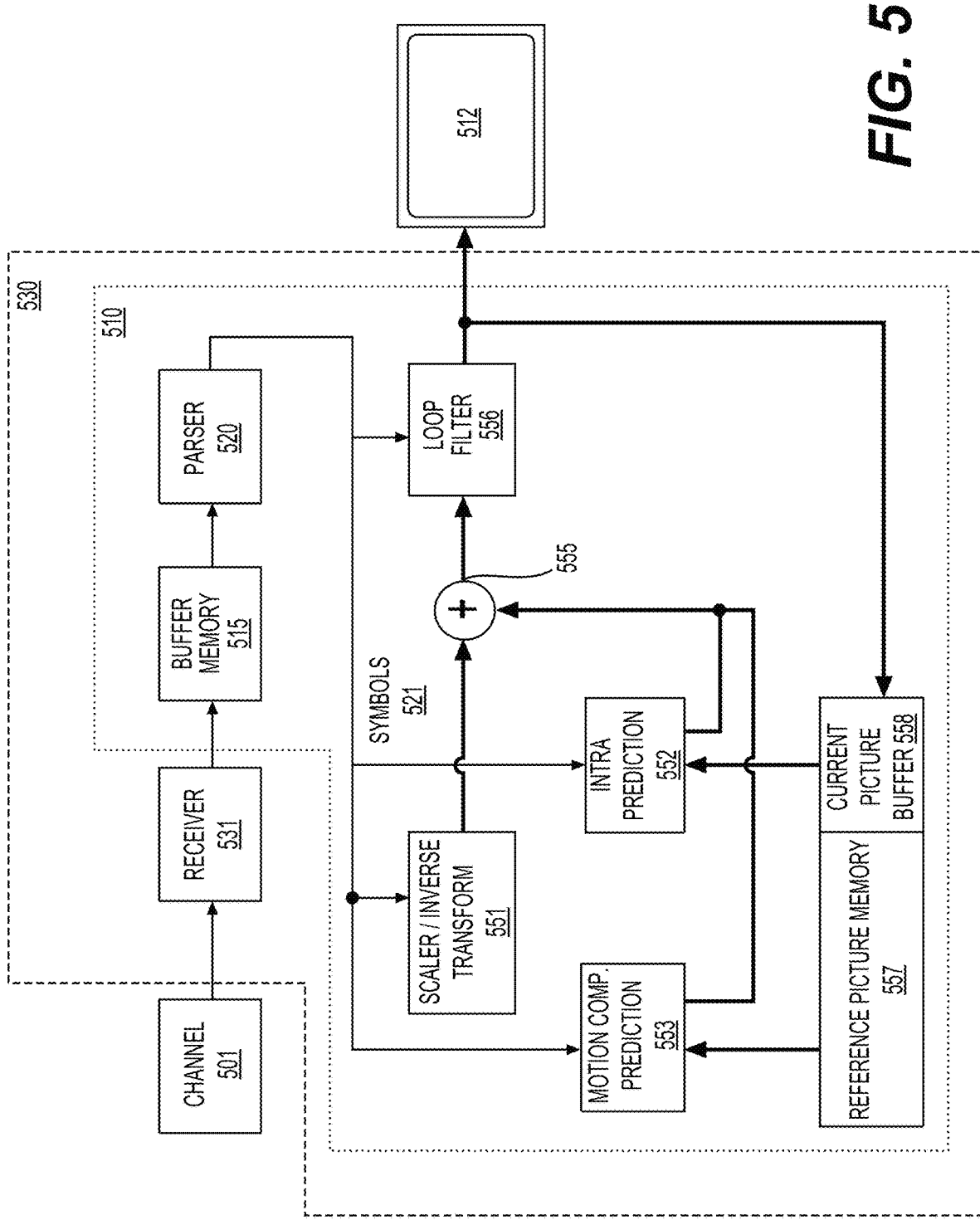
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
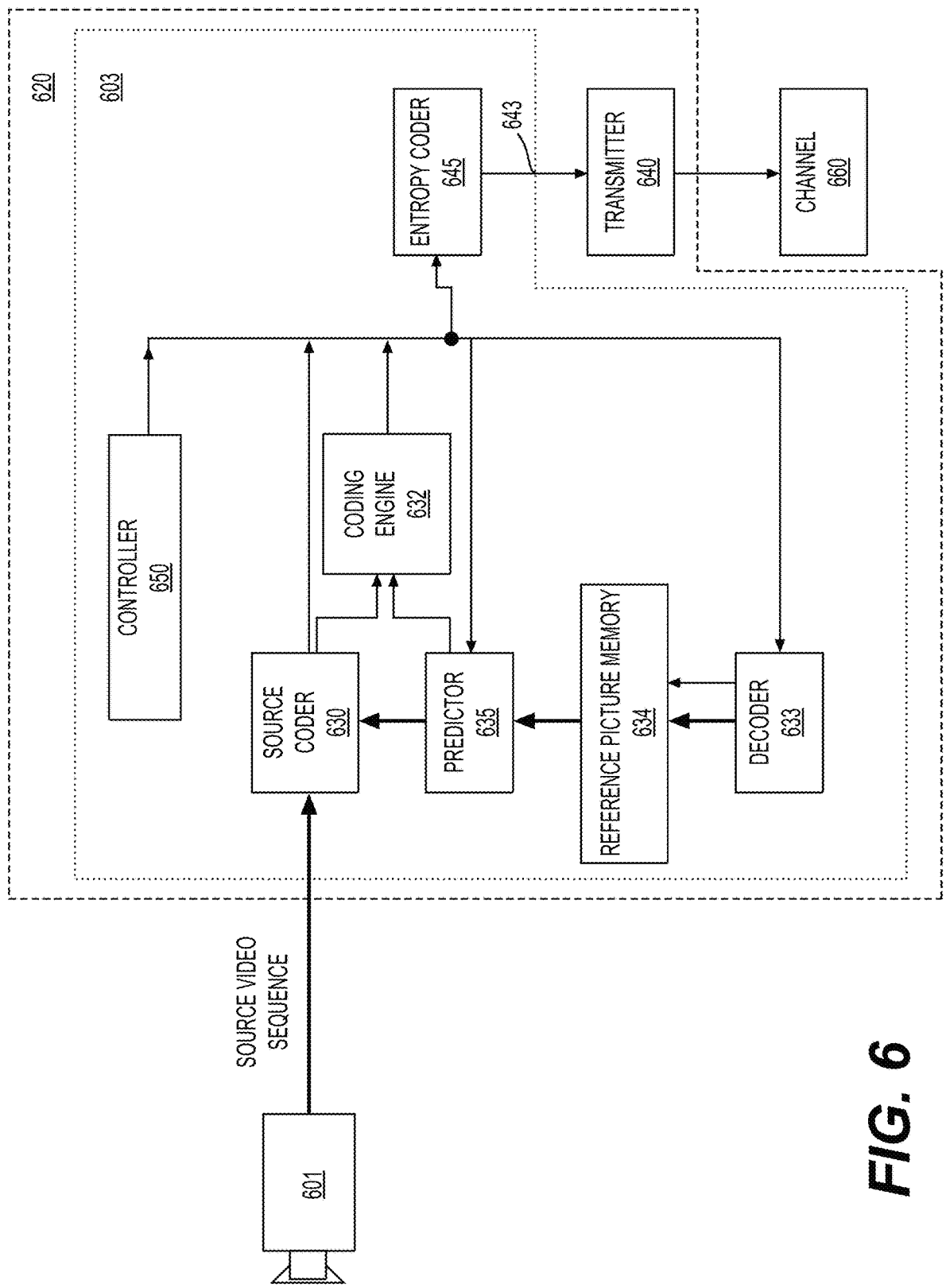
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
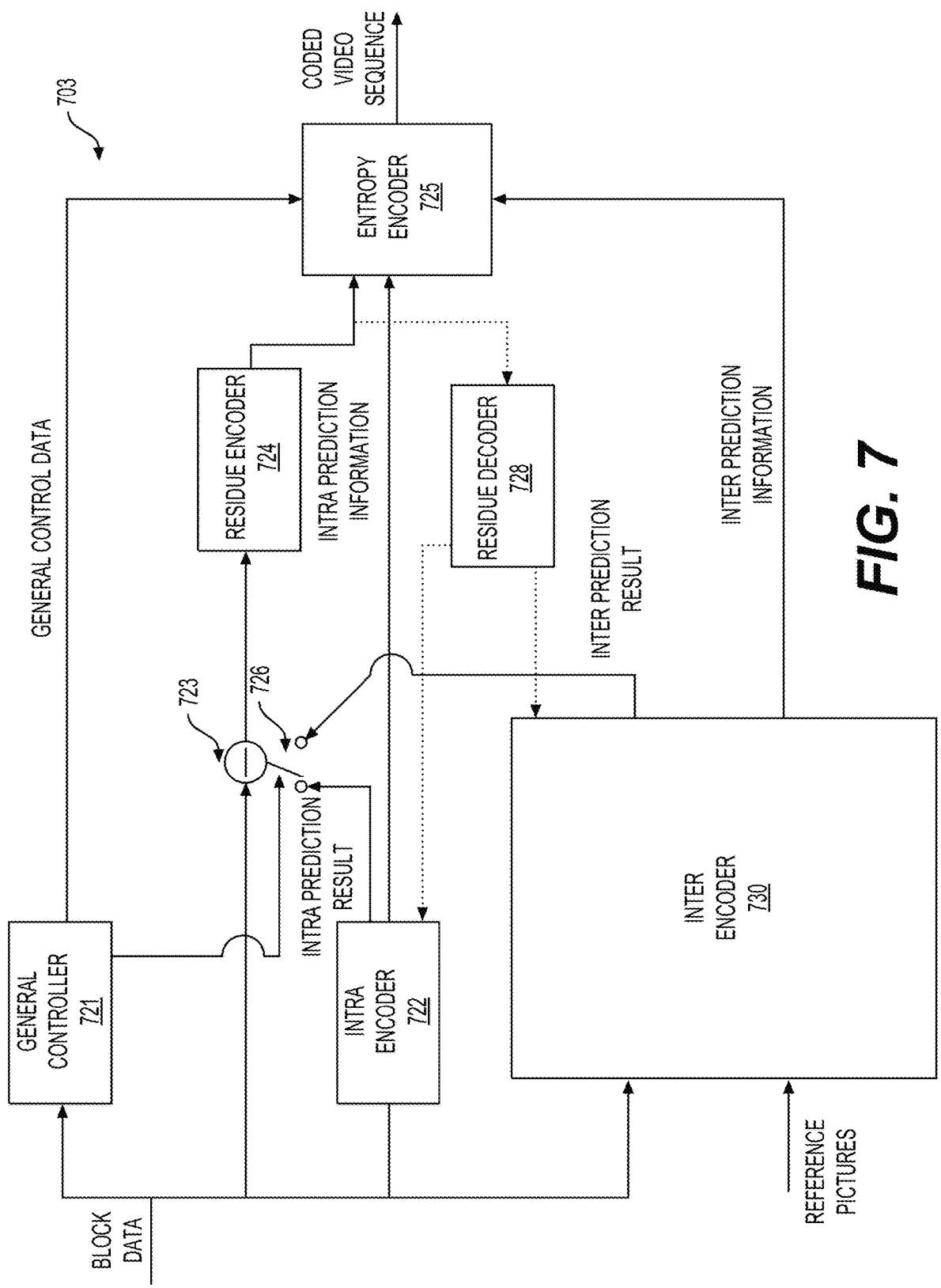
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
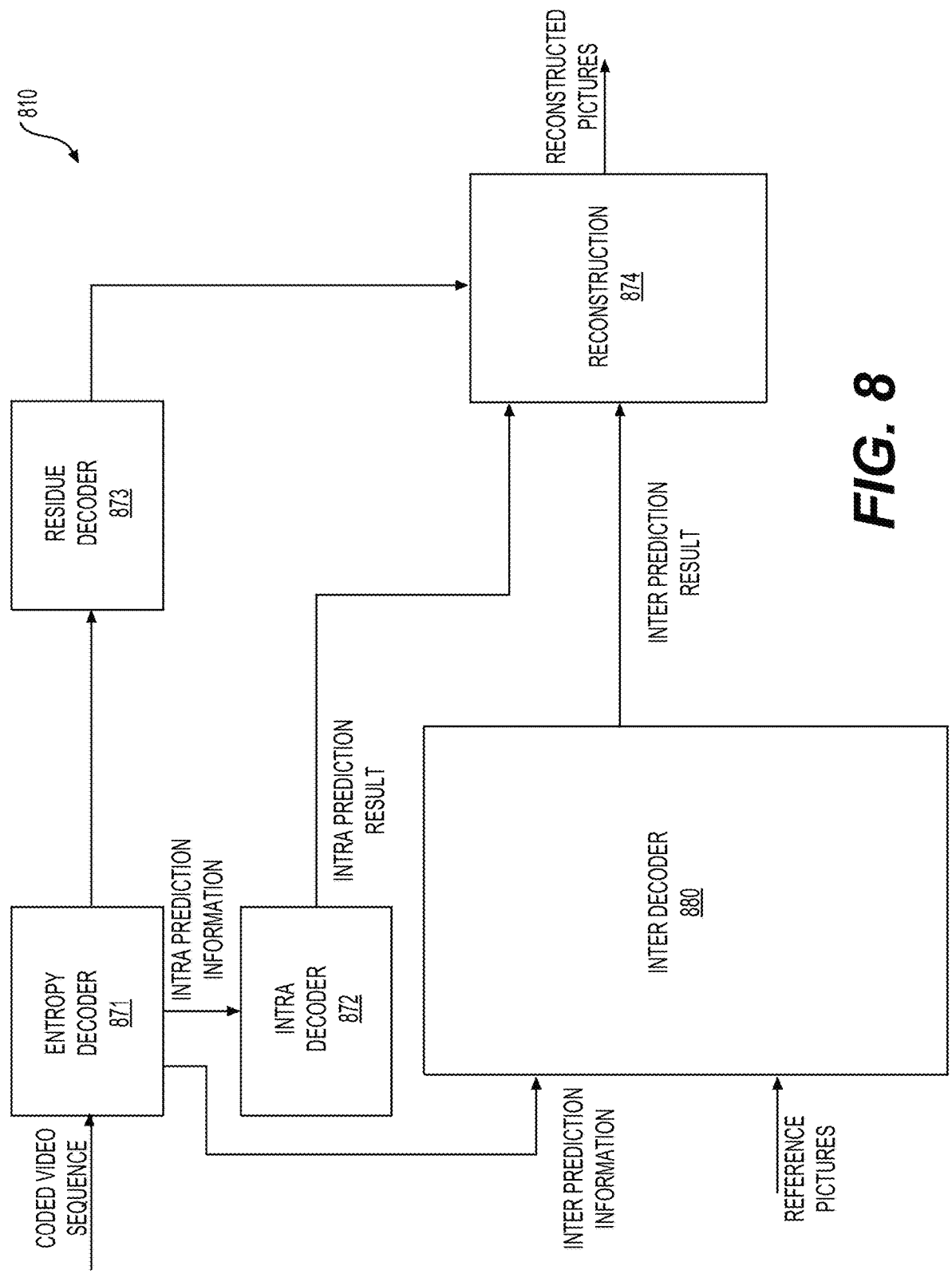
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Video coding technologies related to a transform set or a transform kernel selection scheme based on reconstructed sample(s) of one or more neighboring blocks of a block, such as a feature indicator (e.g., a feature vector or a feature scalar of the reconstructed samples of the one or more neighboring blocks of the block) are disclosed. A video coding format can include an open video coding format designed for video transmissions over the Internet, such as AOMedia Video 1 (AV1) or a next generation AOMedia Video format beyond the AV1. A video coding standard can include High Efficiency Video Coding (HEVC) standard, a next-generation video coding beyond HEVC (e.g., the Versatile Video Coding (VVC)), or the like.

Figure 9:
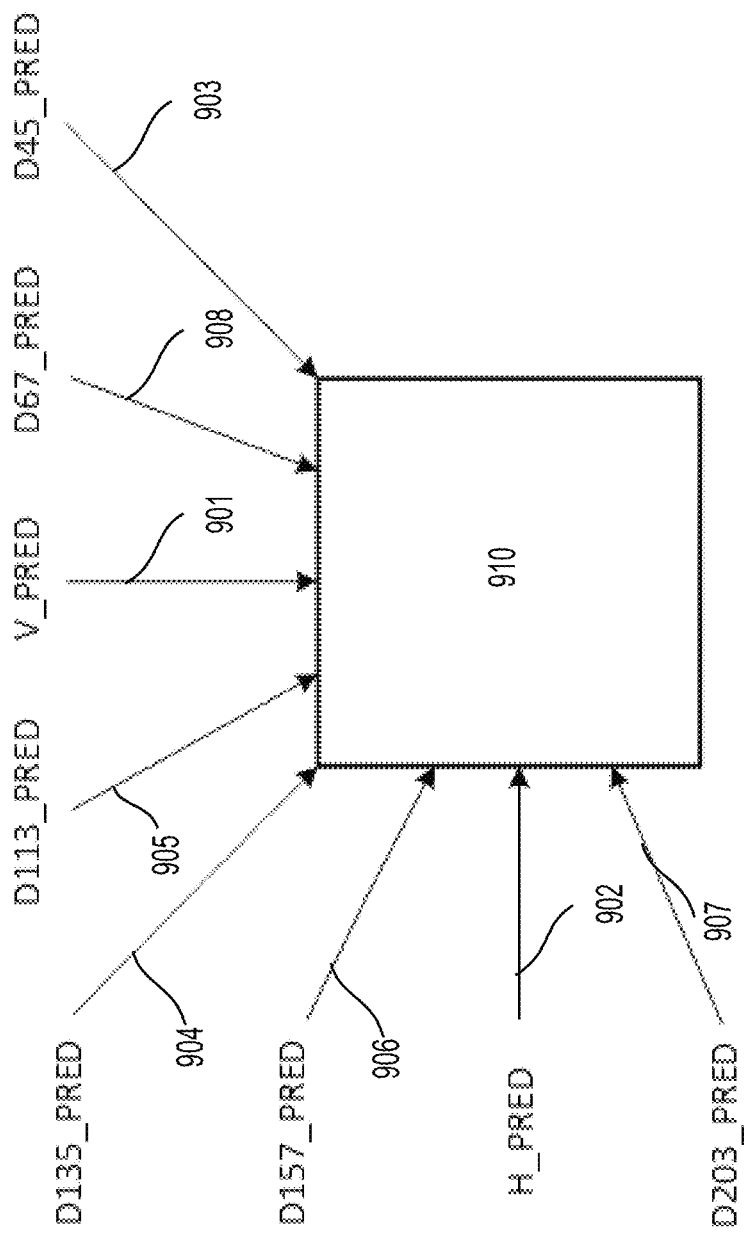
FIG. 9 shows an example of nominal modes for a coding block according to an embodiment of the disclosure.

Various intra prediction modes can be used in intra prediction, for example, in AV1, VVC, and/or the like. In an embodiment, such as in the AV1, directional intra prediction is used. In the directional intra prediction, predicted samples for a block can be generated by extrapolating from neighboring reconstructed samples along a direction. The direction corresponds to an angle. A mode used in the directional intra prediction to predict the predicted samples for the block can be referred to as a directional mode (also referred to as directional prediction modes, directional intra modes, directional intra prediction modes, angular modes). Each directional mode can correspond to a different angle or a different direction. In an example, such as in an open video coding format VP9, eight directional modes corresponding to eight angles from 45° to 207°, as shown in FIG. 9. The eight directional modes can also be referred to as nominal modes (e.g., V_PRED, H_PRED, D45_PRED, D135_PRED, D113_PRED, D157_PRED, D203_PRED, and D67_PRED). To exploit more varieties of spatial redundancy in directional textures, for example in the AV1, directional modes can be extended, for example, beyond the eight nominal modes to an angular set with finer granularity and more angles (or directions), as shown in FIG. 9.

FIG. 9 shows an example of nominal modes for a coding block (CB) (910) according to an embodiment of the disclosure. Certain angles (referred to as nominal angles) can correspond to nominal modes. In an example, eight nominal angles (or nominal intra angles) (901)-(908) correspond to the eight nominal modes (e.g., V_PRED, H_PRED, D45_PRED, D135_PRED, D113_PRED, D157_PRED, D203_PRED, and D67_PRED), respectively. The eight nominal angles (901)-(908) as well as the eight nominal modes can be referred to as V_PRED, H_PRED, D45_PRED, D135_PRED, D113_PRED, D157_PRED, D203_PRED, and D67_PRED, respectively. A nominal mode index can indicate a nominal mode (e.g., one of the eight nominal modes). In an example, the nominal mode index is signaled.

Further, each nominal angle can correspond to a plurality of finer angles (e.g., seven finer angles), and thus 56 angles (or prediction angles) or 56 directional modes (or angular modes, directional intra prediction modes) can be used, for example, in the AV1. Each prediction angle can be presented by a nominal angle and an angular offset (or an angle delta). The angular offset can be obtained by multiplying an offset integer I (e.g., −3, −2, −1, 0, 1, 2, or 3) with a step size (e.g., 3°). In an example, the prediction angle is equal to a sum of the nominal angle and the angular offset. In an example, such as in the AV1, the nominal modes (e.g., the eight nominal modes (901)-(908)) together with certain non-angular smooth modes (e.g., five non-angular smooth modes such as a DC mode, a PAETH mode, a SMOOTH mode, a vertical SMOOTH mode, and a horizontal SMOOTH mode as described below) can be signaled. Subsequently, if a current prediction mode is a directional mode (or an angular mode), an index can be further signaled to indicate the angular offset (e.g., the offset integer I) corresponding to the nominal angle. In an example, the directional mode (e.g., one of the 56 directional modes) can be determined based on the nominal mode index and the index indicating the angular offset from the nominal mode. In an example, to implement directional prediction modes via a generic way, the 56 directional modes such as used in the AV1 are implemented with a unified directional predictor that can project each pixel to a reference sub-pixel location and interpolate the reference pixel by a 2-tap bilinear filter.

Non-directional smooth intra predictors (also referred to as non-directional smooth intra prediction modes, non-directional smooth modes, non-angular smooth modes) can be used in intra prediction for a block, such as a CB. In some examples (e.g., in the AV1), five non-directional smooth intra prediction modes include the DC mode or the DC predictor (e.g., DC), the PAETH mode or the PAETH predictor (e.g., PAETH), the SMOOTH mode or the SMOOTH predictor (e.g., SMOOTH), the vertical SMOOTH mode (referred to as the SMOOTH_V mode, the SMOOTH_V predictor, the SMOOTH_V), and the horizontal SMOOTH mode (referred to as the SMOOTH_H mode, the SMOOTH_H predictor, or SMOOTH_H).

Figure 10:
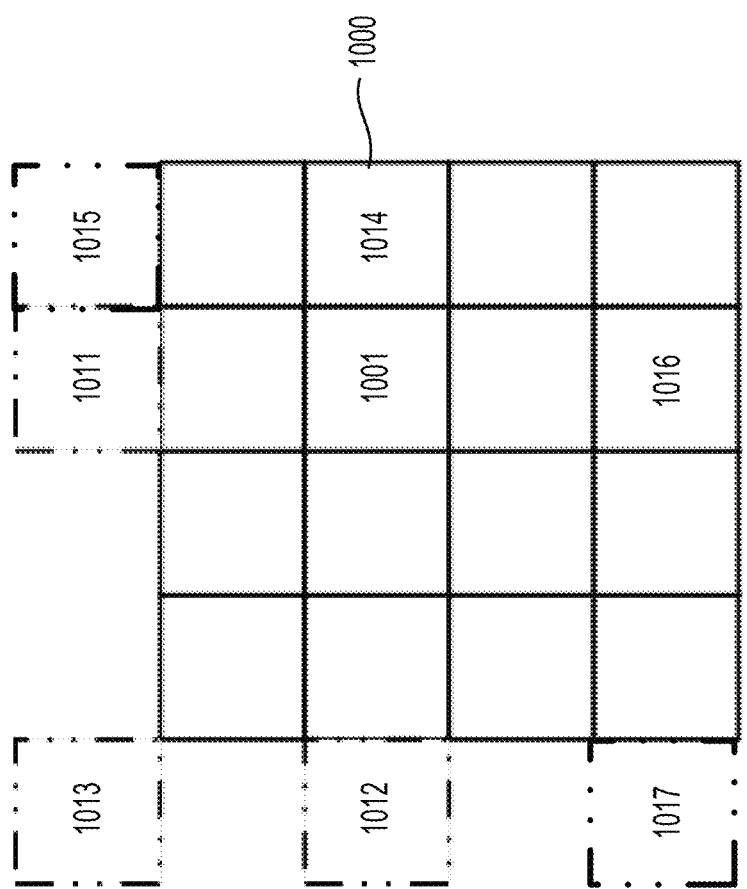
FIG. 10 shows examples for non-directional smooth intra prediction according to aspects of the disclosure.

FIG. 10 shows examples for non-directional smooth intra prediction modes (e.g., the DC mode, the PAETH mode, the SMOOTH mode, the SMOOTH_V mode, and the SMOOTH_H mode) according to aspects of the disclosure. To predict a sample (1001) in a CB (1000) based on the DC predictor, an average of a first value of a left neighboring sample (1012) and a second value of an above neighboring sample (or a top neighboring sample) (1011) can be used as a predictor.

To predict the sample (1001) based on the PAETH predictor, the first value of the left neighboring sample (1012), the second value of the top neighboring sample (1011), and a third value for a top-left neighboring sample (1013) can be obtained. Then, a reference value is obtained using Eq. 1.

$$\text{reference value} = \text{first value} + \text{second value} - \text{third value} \quad (\text{Eq. 1})$$

One of the first value, the second value, and the third value that is closest to the reference value can be set as the predictor for the sample (1001).

The SMOOTH_V mode, the SMOOTH_H mode, and the SMOOTH mode can predict the CB (1000) using a quadratic interpolation in a vertical direction, a horizontal direction, and an average of the vertical direction and the horizontal direction, respectively. To predict the sample (1001) based on the SMOOTH predictor, an average (e.g., a weighted combination) of the first value, the second value, a value of a right sample (1014), and a value of a bottom sample (1016) can be used. In various examples, the right sample (1014) and the bottom sample (1016) are not reconstructed, and thus, a value of a top-right neighboring sample (1015) and a value of a bottom-left neighboring sample (1017) can replace the values of the right sample (1014) and the bottom sample (1016), respectively. Accordingly, an average (e.g., a weighted combination) of the first value, the second value, the value of the top-right neighboring sample (1015), and the value of the bottom-left neighboring sample (1017) can be used as the SMOOTH predictor. To predict the sample (1001) based on the SMOOTH_V predictor, an average (e.g., a weighted combination) of the second value of the top neighboring sample (1011) and the value of the bottom-left neighboring sample (1017) can be used. To predict the sample (1001) based on the SMOOTH_H predictor, an average (e.g., a weighted combination) of the first value of the left neighboring sample (1012) and the value of the top-right neighboring sample (1015) can be used.

Figure 11:
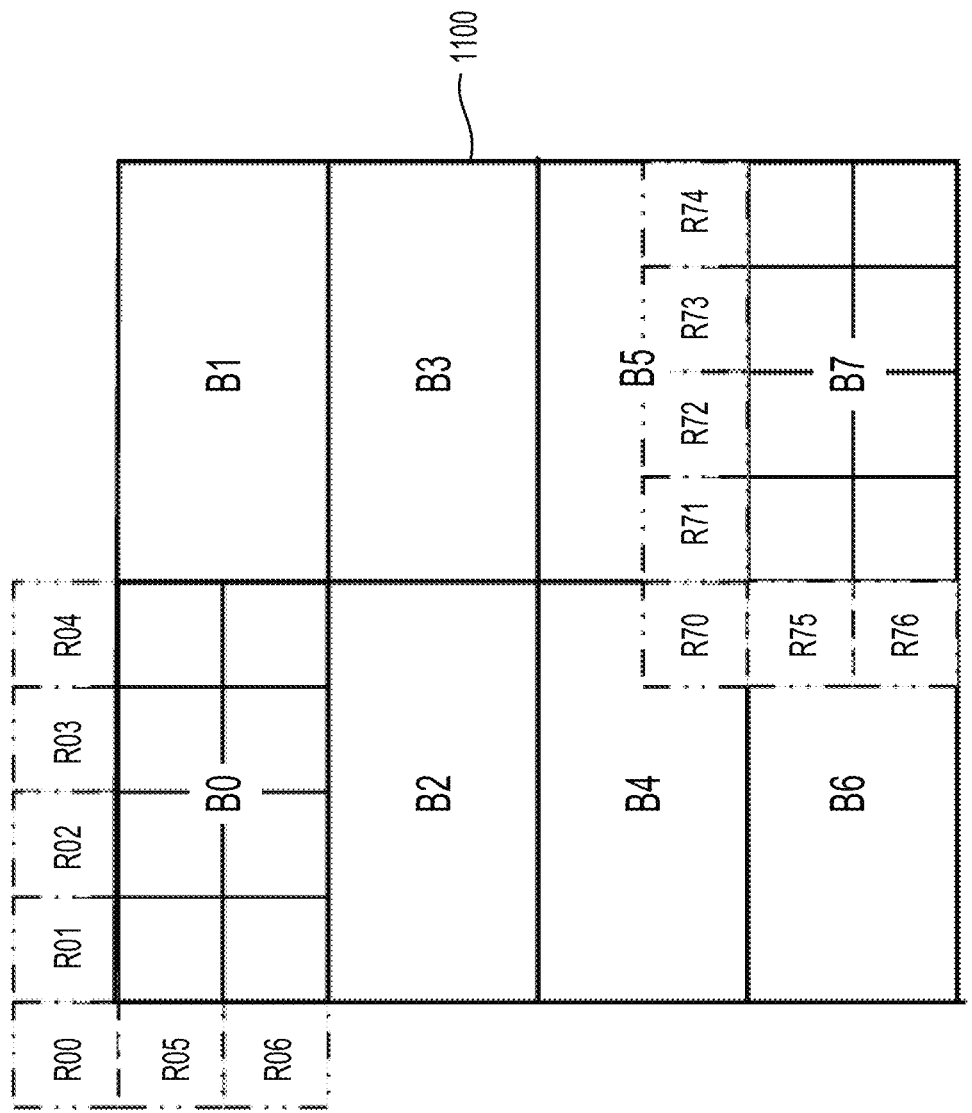
FIG. 11 shows an example of a recursive-filtering-based intra predictor according to an embodiment of the disclosure.

FIG. 11 shows an example of a recursive-filtering-based intra predictor (also referred to as a filter intra mode, or a recursive filtering mode) according to an embodiment of the disclosure. To capture a decaying spatial correlation with references on the edges, a filter intra mode can be used for a block, such as a CB (1100). In an example, the CB (1100) is a luma block. The luma block (1100) can be divided into multiple patches (e.g., eight 4×2 patches 130-B7). Each of the patches 130-137 can have a plurality of neighboring samples. For example, the patch B0 has seven neighboring samples (or seven neighbors) R00-R06 including four top neighboring samples R01-R04, two left neighboring samples R05-R06, and a top-left neighboring sample R00. Similarly, the patch B7 has seven neighboring samples R70-R76 including four top neighboring samples R71-R74, two left neighboring samples R75-R76, and a top-left neighboring sample R70.

In some examples, multiple (e.g., five) filter intra modes (or multiple recursive filtering modes) are pre-designed, for example, for the AV1. Each filter intra mode can be represented by a set of eight 7-tap filters reflecting correlation between samples (or pixels) in a corresponding 4×2 patch (e.g., B0) and seven neighbors (e.g., R00-R06) that are adjacent to the 4×2 patch B0. Weighting factors for the 7-tap filter can be position dependent. For each of the patches 130-137, the seven neighbors (e.g., R00-R06 for B0, R70-R76 for B7) can be used to predict the samples in the corresponding patch. In an example, the neighbors R00-R06 are used to predict the samples in the patch B0. In an example, the neighbors R70-R76 are used to predict the samples in the patch B7. For certain patches in the CB (1100), such as the patch B0, all the seven neighbors (e.g., R00-R06) are already reconstructed. For other patches in the CB (1100), at least one of the seven neighbors is not reconstructed, and thus predicted value(s) of immediate neighbor(s) (or prediction sample(s) of immediate neighbor(s)) can be used as reference(s). For example, the seven neighbors R70-R76 of the patch B7 are not reconstructed, so the prediction samples of the immediate neighbors can be used.

A chroma sample can be predicted from a luma sample. In an embodiment, a chroma from luma mode (e.g., a CfL mode, a CfL predictor) is a chroma-only intra predictor that can model chroma samples (or pixels) as a linear function of coincident reconstructed luma samples (or pixels). For example, the CfL prediction can be expressed using Eq. 2 as below.

$$CfL(\alpha) = \alpha L^A + D \quad (\text{Eq. 2})$$

where $L^A$ denotes an AC contribution of a luma component, α denotes a scaling parameter of the linear model, and D denotes a DC contribution of a chroma component. In an example, reconstructed luma pixels are subsampled based on a chroma resolution, and an average value is subtracted to form the AC contribution (e.g., $L^A$). To approximate a chroma AC component from the AC contribution, instead of requiring a decoder to calculate the scaling parameter α, in some examples, such as in the AV1, the CfL mode determines the scaling parameter α based on original chroma pixels and signals the scaling parameter α in a bitstream, thus reducing decoder complexity and yielding a more precise prediction. The DC contribution of the chroma component can be computed using an intra DC mode. The intra DC mode can be sufficient for most chroma content and have mature fast implementations.

Figure 12:
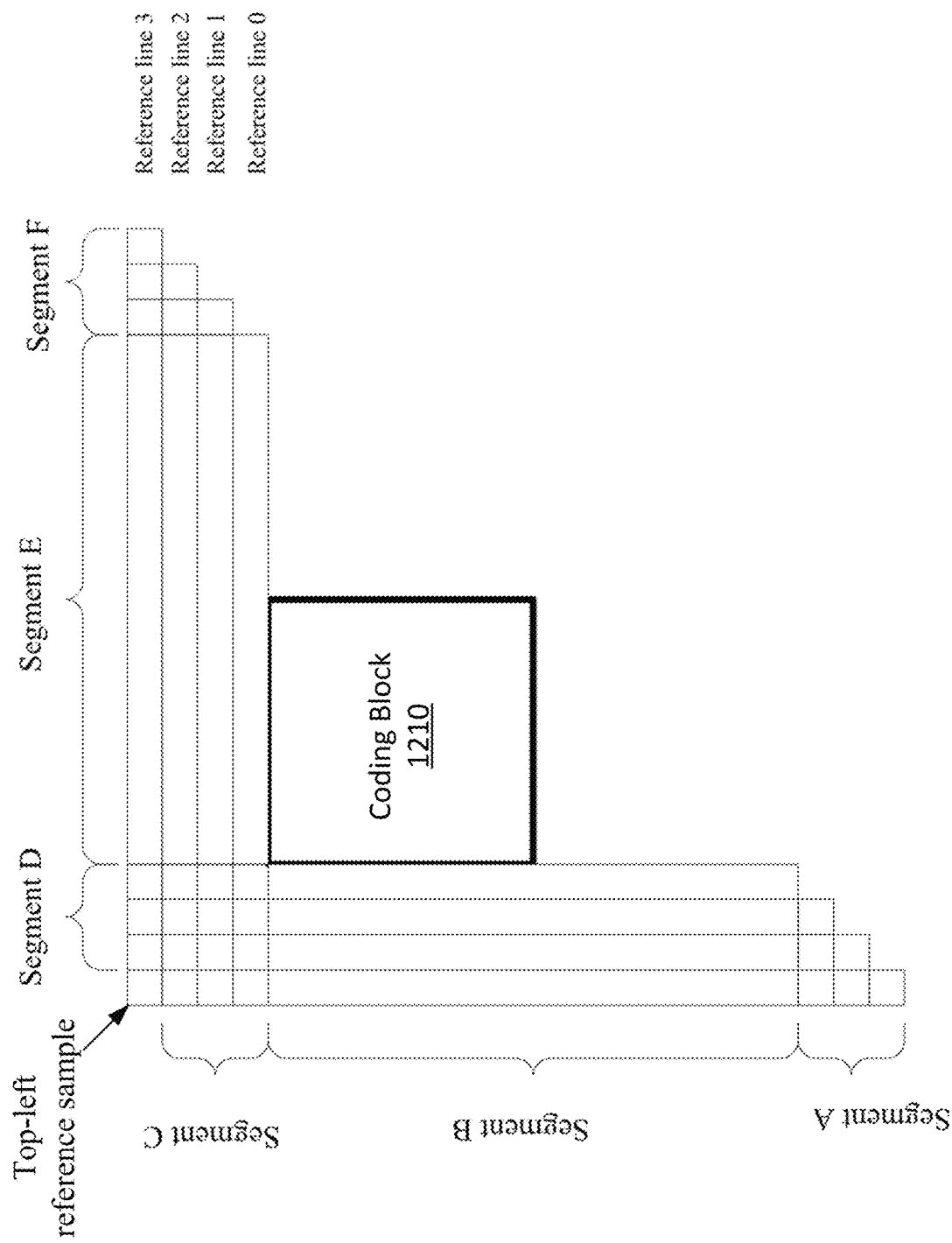
FIG. 12 shows an example of multiple reference lines for a coding block according to an embodiment of the disclosure.

Multi-line intra prediction can use more reference lines for intra prediction. A reference line can include multiple samples in a picture. In an example, the reference line includes samples in a row and samples in a column. In an example, an encoder can determine and signal a reference line used to generate the intra predictor. An index (also referred to as a reference line index) indicating the reference line can be signaled before intra prediction mode(s). In an example, only the MPMs are allowed when a nonzero reference line index is signaled. FIG. 12 shows an example of four reference lines for a CB (1210). Referring to FIG. 12, a reference line can include up to six segments, e.g., Segments A to F, and a top-left reference sample. For example, the reference line 0 includes the Segments B and E and a top-left reference sample. For example, the reference line 3 includes the Segments A to F and a top-left reference sample. The Segment A and F can be padded with closest samples from the Segment B and E, respectively. In some examples, such as in the HEVC, only one reference line (e.g., the reference line 0 that is adjacent to the CB (1210)) is used for intra prediction. In some examples, such as in the VVC, multiple reference lines (e.g., the reference lines 0, 1, and 3) are used for intra prediction.

In general, a block can be predicted using one or a suitable combination of various intra prediction modes such as described above with references to FIGS. 9-12.

Embodiments of primary transforms, such as those used in AOMedia Video 1 (AV1), are described below. A forward transform (e.g., in an encoder) can be performed on a transform block (TB) including residuals (e.g., residuals in a spatial domain) to obtain a TB including transform coefficients in a frequency domain (or a spatial frequency domain). The TB including the residuals in the spatial domain can be referred to as a residual TB and the TB including the transform coefficients in the frequency domain can be referred to as a coefficient TB. In an example, the forward transform includes a forward primary transform that can transform the residual TB into the coefficient TB. In an example, the forward transform includes a forward primary transform and a forward secondary transform where the forward primary transform can transform the residual TB into an intermediate coefficient TB, and the forward secondary transform can transform the intermediate coefficient TB into the coefficient TB.

An inverse transform (e.g., in an encoder or in a decoder) can be performed on the coefficient TB in the frequency domain to obtain the residual TB in the spatial domain. In an example, the inverse transform includes an inverse primary transform that can transform the coefficient TB into the residual TB. In an example, the inverse transform includes an inverse primary transform and an inverse secondary transform where the inverse secondary transform can transform the coefficient TB into the intermediate coefficient TB and the inverse primary transform can transform the intermediate coefficient TB into the residual TB.

In general, a primary transform can refer to the forward primary transform or the inverse primary transform where the primary transform is performed between the residual TB and the coefficient TB. In some embodiments, the primary transform can be a separable transform where the 2D primary transform can include a horizontal primary transform (also referred to as a horizontal transform) and a vertical primary transform (also referred to as a vertical transform). A secondary transform can refer to the forward secondary transform or the inverse secondary transform where the secondary transform is performed between the intermediate coefficient TB and the coefficient TB.

In order to support extended coding block partitions, such as described in the disclosure, multiple transform sizes (e.g., ranging from 4-point to 64-point for each dimension) and transform shapes (e.g., square, a rectangular shape with a width over a height ratio of 2:1, 1:2, 4:1, or 1:4) can be used, such as in AV1.

A 2D transform process can use hybrid transform kernels that can include a different 1D transform for each dimension of a coded residual block. Primary 1D transforms can include (a) a 4-point, an 8-point, a 16-point, a 32-point, a 64-point DCT-2; (b) a 4-point, an 8-point, a 16-point asymmetric DST (ADST) (e.g., a DST-4, a DST-7) and corresponding flipped versions (e.g., a flipped version or a FlipADST of an ADST can apply the ADST in a reverse order); and/or (c) a 4-point, an 8-point, a 16-point, a 32-point identity transform (IDTX). FIG. 13 shows examples of primary transform basis functions according to embodiments of the disclosure. The primary transform basis functions in the FIG. 13 example include basis functions for the DCT-2 and the asymmetric DSTs (DST-4 and DST-7) having an N-point input. The primary transform basis functions shown in FIG. 13 can be used in AV1.

The availability of hybrid transform kernels can be dependent on a transform block size and a prediction mode. FIG. 14A shows exemplary dependencies of the availability of various transform kernels (e.g., transform types shown in the first column and described in the second column) based on the transform block size (e.g., sizes shown in the third column) and the prediction mode (e.g., the intra prediction and the inter prediction shown in the third column). The exemplary hybrid transform kernels and the availability based on the prediction modes and transform block sizes can be used in AV1. Referring to FIG. 14A, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type (1410) is denoted by ADST_DCT as shown in the first column of FIG. 14A. The transform type (1410) includes an ADST in the vertical direction and a DCT in the horizontal direction as shown in the second column of FIG. 14A. According to the third column of FIG. 14A, the transform type (1410) is available for the intra prediction and the inter prediction when the block size is less than or equal to 16×16 (e.g., 16×16 samples, 16×16 luma samples).

In an example, a transform type (1420) is denoted by V_ADST as shown in the first column of FIG. 14A. The transform type (1420) includes an ADST in the vertical direction and an IDTX (i.e., an identity matrix) in the horizontal direction as shown in the second column of FIG. 14A. Thus, the transform type (1420) (e.g., V_ADST) is performed in the vertical direction and is not performed in the horizontal direction. According to the third column of FIG. 14A, the transform type (1420) is not available for the intra prediction regardless of the block size. The transform type (1420) is available for the inter prediction when the block size is less than 16×16 (e.g., 16×16 samples, 16×16 luma samples).

In an example, FIG. 14A is applicable for a luma component. For a chroma component, a transform type (or a transform kernel) selection can be performed implicitly. In an example, for intra prediction residuals, the transform type can be selected according to an intra prediction mode, as shown in FIG. 14B. In an example, transform type selections shown in FIG. 14B are applicable to a chroma component. For inter prediction residuals, the transform type can be selected according to the transform type selection of a co-located luma block. Therefore, in an example, a transform type for the chroma component is not signaled in a bitstream.

A transform, such as a primary transform, a secondary transform, can be applied to a block such as a CB. In an example, a transform includes a combination of a primary transform, a secondary transform. A transform can be a non-separable transform, a separable transform, or a combination of a non-separable transform and a separable transform.

Figure 15:
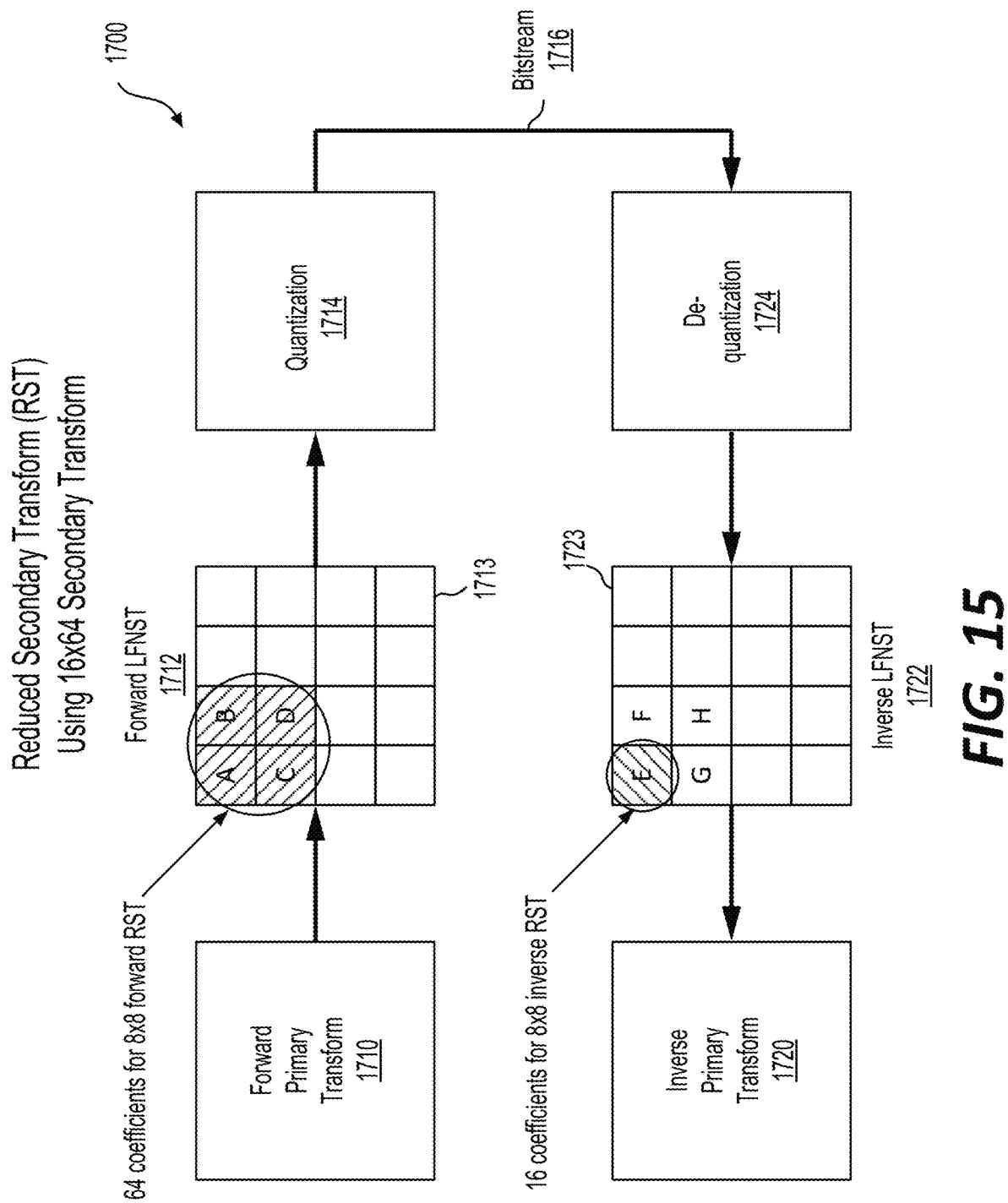
FIGS. 15-16 show examples of two transform coding processes (1700) and (1800) using a 16×64 transform and a 16×48 transform, respectively according to embodiments of the disclosure.
Figure 16:
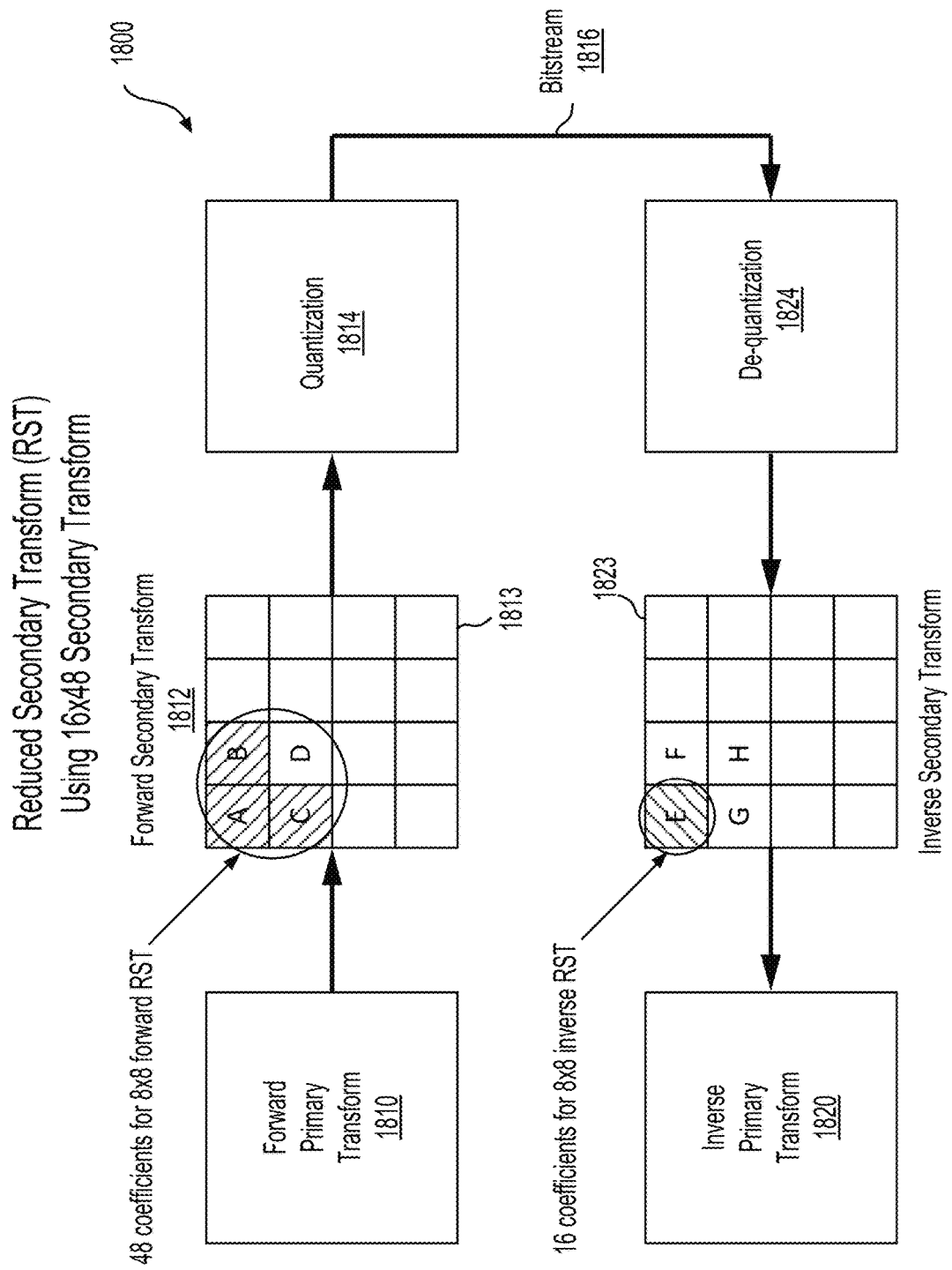

A secondary transform can be performed such as in VVC. In some examples, such as in VVC, a low-frequency non-separable transform (LFNST), which is also known as a reduced secondary transform (RST), can be applied between a forward primary transform and quantization at an encoder side and between de-quantization and an inverse primary transform at a decoder side as shown in FIGS. 15-16 to further de-correlate primary transform coefficients.

Application of a non-separable transform, which can be used in an LFNST, can be described as follows using a 4×4 input block (or an input matrix) X as an example (shown in Eq. 3). To apply the 4×4 non-separable transform (e.g., the LFNST), the 4×4 input block X can be represented by a vector $\vec{X}$, as shown in Eqs. 3-4.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 3)}$$

$$\vec{X} = \quad \text{(Eq. 4)}$$
$$[X_{00} X_{01} X_{02} X_{03} X_{10} X_{11} X_{12} X_{13} X_{20} X_{21} X_{22} X_{23} \quad X_{30} X_{31} X_{32} X_{33}]^T$$

The non-separable transform can be calculated as $\vec{F} = T \cdot \vec{X}$, where $\vec{F}$ indicates a transform coefficient vector, and T is a 16×16 transform matrix. The 16×1 coefficient vector $\vec{F}$ can be subsequently reorganized into a 4×4 output block (or an output matrix, a coefficient block) using a scanning order (e.g., a horizontal scanning order, a vertical scanning order, a zigzag scanning order, or a diagonal scanning order) for the 4×4 input block. The transform coefficients with smaller indices can be placed with smaller scanning indices in the 4×4 coefficient block.

A non-separable secondary transform can be applied to a block (e.g., a CB). In some examples, such as in the VVC, the LFNST is applied between a forward primary transform and quantization (e.g., at an encoder side) and between de-quantization and an inverse primary transform (e.g., at a decoder side) as shown in FIGS. 15-16.

FIGS. 15-16 show examples of two transform coding processes (1700) and (1800) using a 16×64 transform (or a 64×16 transform depending on whether the transform is a forward or inverse secondary transform) and a 16×48 transform (or a 48×16 transform depending on whether the transform is a forward or inverse secondary transform), respectively. Referring to FIG. 15, in the process (1700), at an encoder side, a forward primary transform (1710) can first be performed over a block (e.g., a residual block) to obtain a coefficient block (1713). Subsequently, a forward secondary transform (or a forward LFNST) (1712) can be applied to the coefficient block (1713). In the forward secondary transform (1712), 64 coefficients of 4×4 sub-blocks A-D at a top-left corner of the coefficient block (1713) can be represented by a 64-length vector, and the 64-length vector can be multiplied with a transform matrix of 64×16 (i.e., a width of 64 and a height of 16), resulting in a 16-length vector. Elements in the 16-length vector are filled back into the top-left 4×4 sub-block A of the coefficient block (1713). The coefficients in the sub-blocks B-D can be zero. The resulting coefficients after the forward secondary transform (1712) are then quantized at a quantization step (1714), and entropy-coded to generate coded bits in a bitstream (1716).

The coded bits can be received at a decoder side, and entropy-decoded followed by a de-quantization step (1724) to generate a coefficient block (1723). An inverse secondary transform (or an inverse LFNST) (1722), such as an inverse RST8×8, can be performed to obtain 64 coefficients, for example, from the 16 coefficients at a top-left 4×4 sub-block E. The 64 coefficients can be filled back to the 4×4 sub-blocks E-H. Further, the coefficients in the coefficient block (1723) after the inverse secondary transform (1722) can be processed with an inverse primary transform (1720) to obtain a recovered residual block.

The process (1800) of the FIG. 16 example is similar to the process (1700) except that fewer (i.e., 48) coefficients are processed during the forward secondary transform (1712). Specifically, the 48 coefficients in the sub-blocks A-C are processed with a smaller transform matrix of a size of 48×16. Using the smaller transform matrix of 48×16 can reduce a memory size for storing the transform matrix and a number of calculations (e.g., multiplications, additions, subtractions, and/or the like), and thus can reduce computation complexity.

In an example, a 4×4 non-separable transform (e.g., a 4×4 LFNST) or an 8×8 non-separable transform (e.g., an 8×8 LFNST) is applied according to a block size of the block (e.g., the CB). The block size of the block can include a width, a height, or the like. For example, the 4×4 LFNST is applied for the block where a minimum of the width and the height is less than a threshold, such as 8 (e.g., min (the width, the height)<8). For example, the 8×8 LFNST is applied for the block where the minimum of the width and the height is larger than a threshold, such as 4 (e.g., min (width, height)>4).

A non-separable transform (e.g., the LFNST) can be based on a direct matrix multiplication approach, and thus can be implemented in a single pass without iteration. To reduce a non-separable transform matrix dimension and to minimize computational complexity and memory space to store transform coefficients, a reduced non-separable transform method (or RST) can be used in the LFNST. Accordingly, in the reduced non-separable transform, an N (e.g., N is 64 for an 8×8 non-separable secondary transform (NSST)) dimensional vector can be mapped to an R dimensional vector in a different space, where N/R (R<N) is a reduction factor. Hence, instead of an N×N matrix, an RST matrix is an R×N matrix as described in Eq. 5.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad (\text{Eq. 5})$$

In Eq. 5, R rows of the R×N transform matrix are R bases of the N dimensional space. The inverse transform matrix can be a transpose of the transform matrix (e.g., $T_{R \times N}$) used in the forward transform. For an 8×8 LFNST, a reduction factor of 4 can be applied, and a 64×64 direct matrix used in an 8×8 non-separable transform can be reduced to a 16×64 direct matrix, as shown in FIG. 15. Alternatively, a reduction factor larger than 4 can be applied, and the 64×64 direct matrix used in the 8×8 non-separable transform can be reduced to a 16×48 direct matrix, as shown in FIG. 16. Hence, a 48×16 inverse RST matrix can be used at a decoder side to generate core (primary) transform coefficients in an 8×8 top-left region.

Referring to FIG. 16, when the 16×48 matrix is applied instead of the 16×64 matrix with a same transform set configuration, an input to the 16×48 matrix includes 48 input data from three 4×4 blocks A, B, and C in a top-left 8×8 block excluding a right-bottom 4×4 block D. With a reduction in the dimension, a memory usage for storing LFNST matrices can be reduced, for example, from 10 KB to 8 KB with a minimal performance drop.

In order to reduce complexity, the LFNST can be restricted to be applicable if coefficients outside a first coefficient subgroup are non-significant. In an example, the LFNST can be restricted to be applicable only if all coefficients outside the first coefficient subgroup are non-significant. Referring to FIGS. 15-16, the first coefficient subgroup corresponds to the top-left block E, and thus the coefficients that are outside the block E are non-significant.

In an example, primary-only transform coefficients are non-significant (e.g., zero) when the LFNST is applied. In an example, all primary-only transform coefficients are zero when the LFNST is applied. The primary-only transform coefficients can refer to transform coefficients that are obtained from a primary transform without a secondary transform. Accordingly, an LFNST index signaling can be conditioned on a last-significant position, and thus avoiding an extra coefficient scanning in the LFNST. In some examples, the extra coefficient scanning is used to check significant transform coefficients at specific positions. In an example, the worst-case handling of the LFNST, for example, in terms of multiplications per pixel restricts the non-separable transform for a 4×4 block and an 8×8 block to an 8×16 transform and an 8×48 transform, respectively. In the above cases, the last-significant scan position can be less than 8 when the LFNST is applied. For other sizes, the last-significant scan position can be less than 16 when the LFNST is applied. For a CB of 4×N and N×4 and N is larger than 8, the restriction can imply that the LFNST is applied to a top-left 4×4 region in the CB. In an example, the restriction implies that the LFNST is applied only once to the top-left 4×4 region only in the CB. In an example, all the primary-only coefficients are non-significant (e.g., zero) when the LFNST is applied, a number of operations for the primary transform is reduced. From an encoder perspective, quantization of transform coefficients can be significantly simplified when the LFNST transform is tested. A rate-distortion optimized quantization can be done at maximum for the first 16 coefficients, for example, in a scanning order, remaining coefficients can be set to zero.

An LFNST transform (e.g., a transform kernel, a transform core, or a transform matrix) can be selected as described below. In an embodiment, multiple transform sets can be used, and one or more non-separable transform matrices (or kernels) can be included in each of the multiple transform sets in the LFNST. According to aspects of the disclosure, a transform set can be selected from the multiple transform sets, and a non-separable transform matrix can be selected from the one or more non-separable transform matrices in the transform set.

Table 1 shows an exemplary mapping from intra prediction modes to the multiple transform sets according to an embodiment of the disclosure. The mapping indicates a relationship between the intra prediction modes and the multiple transform sets. The relationship, such as indicated in Table 1, can be pre-defined and can be stored in an encoder and a decoder.

TABLE 1

| Transform set selection table | |
| --- | --- |
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

Referring to Table 1, the multiple transform sets include four transform sets, e.g., transform sets 0 to 3 represented by a transform set index (e.g., Tr. set index) from 0 to 3, respectively. An index (e.g., an IntraPredMode) can indicate the intra prediction mode, and the transform set index can be obtained based on the index and Table 1. Accordingly, the transform set can be determined based on the intra prediction mode. In an example, if one of three cross component linear model (CCLM) modes (e.g., INTRA_LT_CCLM, INTRA_T_CCLM or INTRA_L_CCLM) is used for a CB (e.g., 81<=IntraPredMode<=83), the transform set 0 is selected for the CB.

As described above, each transform set can include the one or more non-separable transform matrices. One of the one or more non-separable transform matrices can be selected by an LFNST index that is, for example, explicitly signaled. The LFNST index can be signaled in a bitstream once per intra-coded CU (e.g., the CB), for example, after signaling transform coefficients. In an embodiment, each transform set includes two non-separable transform matrices (kernels), and the selected non-separable secondary transform candidate can be one of the two non-separable transform matrices. In some examples, the LFNST is not applied to a CB (e.g., the CB coded with a transform skip mode or a number of non-zero coefficients of the CB is less than a threshold). In an example, the LFNST index is not signaled for the CB when the LFNST is not to be applied to the CB. A default value for the LFNST index can be zero and not signaled, indicating that the LFNST is not applied to the CB.

In an embodiment, the LFNST is restricted to be applicable only if all coefficients outside the first coefficient subgroup are non-significant, coding of the LFNST index can depend on a position of the last significant coefficient. The LFNST index can be context coded. In an example, the context coding of the LFNST index does not depend on an intra prediction mode, and only a first bin is context coded. The LFNST can be applied to an intra-coded CU in an intra slice or in an inter slice, and for both Luma and Chroma components. If a dual tree is enabled, LFNST indices for Luma and Chroma components can be signaled separately. For an inter slice (e.g., the dual tree is disabled), a single LFNST index can be signaled and used for both the Luma and Chroma components.

Intra sub-partition (ISP) coding mode can be used. In the ISP coding mode, a luma intra-predicted block can be divided vertically or horizontally into 2 or 4 sub-partitions depending on a block size. In some examples, performance improvement is marginal when the RST is applied to every feasible sub-partition. Thus, in some examples, when an ISP mode is selected, the LFNST is disabled and the LFNST index (or an RST index) is not signaled. Disabling the RST or the LFNST for ISP-predicted residues can reduce coding complexity. In some examples, the LFNST is disabled and the LFNST index is not signaled when a matrix-based intra predication mode (MIP) is selected.

In some example, a CU larger than 64×64 is implicitly split (TU tiling) due to a maximum transform size restriction (e.g., 64×64), an LFNST index search can increase data buffering by four times for a certain number of decode pipeline stages. Therefore, the maximum size that the LFNST is allowed can be restricted to 64×64. In an example, the LFNST is enabled with a discrete cosine transform (DCT) type 2 (DCT-2) transform only.

In some examples, separable transform schemes may not be efficient for capturing directional texture patterns (e.g., edges which are along a 45° or a 135° direction). A non-separable transform scheme may improve coding efficiency, for example, in the above scenarios. To reduce computational complexity and memory usage, the non-separable transform scheme can be used as a secondary transform that is applied to low frequency transform coefficients that are obtained from a primary transform.

In certain implementations, the selection of a transform kernel to be used, for example, from a group of transform kernels, is based on prediction mode information. The prediction mode information can indicate a prediction mode.

In some examples, the prediction mode information alone provides only a coarse representation of an entire space of residual patterns observed for the prediction mode. FIGS. 17A-17D show exemplary residual patterns (in grayscale) observed for the directional mode D45_PRED (45°) that is an intra prediction mode in AV1 according to an embodiment of the disclosure. According to aspects of the disclosure, neighboring reconstructed samples can provide additional information for more efficient representation of the residual patterns. Thus, methods of a transform set selection and/or a transform kernel selection that are based on the neighboring reconstructed samples in addition to the prediction mode information are disclosed. For example, a feature indicator (e.g., a feature vector $\vec{F}$ or a feature scalar S) of the neighboring reconstructed samples is used as an input to the selection process in addition to the prediction mode information.

In the present disclosure, the term block may refer to a PB, a CB, a coded block, a coding unit (CU), a transform block (TB), a transform unit (TU), a luma block (e.g., a luma CB), a chroma block (e.g., a chroma CB), or the like.

In the present disclosure, the size of a block can refer to a block width, a block height, a block aspect ratio (e.g., a ratio of a block width over a block height, a ratio of a block height over a block width), a block area size or a block area (e.g., a block width x a block height), a minimum of a block width and a block height, a maximum of a block width and a block height, and/or the like.

In the present disclosure, a transform kernel for a block can be used in a primary transform, a secondary transform, a tertiary transform, or a transform scheme that is beyond the tertiary transform. The transform kernel can be used in a separable transform or a non-separable transform. The transform kernel can be used for a luma block, a chroma block, in the inter prediction, in the intra prediction, or the like. The transform kernel can also be referred to as a transform core, a transform candidate, a transform kernel option, or the like. In an example, the transform kernel is a transform matrix. The block can be transformed based at least on the transform kernel. Thus, methods in the disclosure can be applied to a primary transform, a secondary transform, a tertiary transform, any transform scheme that is beyond the tertiary transform, a separable transform, a non-separable transform, a luma block, a chroma block, the inter prediction, the intra prediction, or the like.

In the present disclosure, a transform set can refer to a group of transform kernels or transform kernel options. A transform set can include one or more transform kernels or transform kernel options. In an example, the transform kernel for a block can be selected from the transform set.

According to aspects of the disclosure, neighboring reconstructed sample(s) can be used to determine a transform kernel from a group of transform sets. Neighboring reconstructed sample(s) of a block under reconstruction in a current picture can be used to determine a transform kernel for the block from a group of transform sets. The group of transform sets can be pre-determined. In an example, the group of transform sets is pre-stored in an encoder and/or a decoder.

Figure 18:
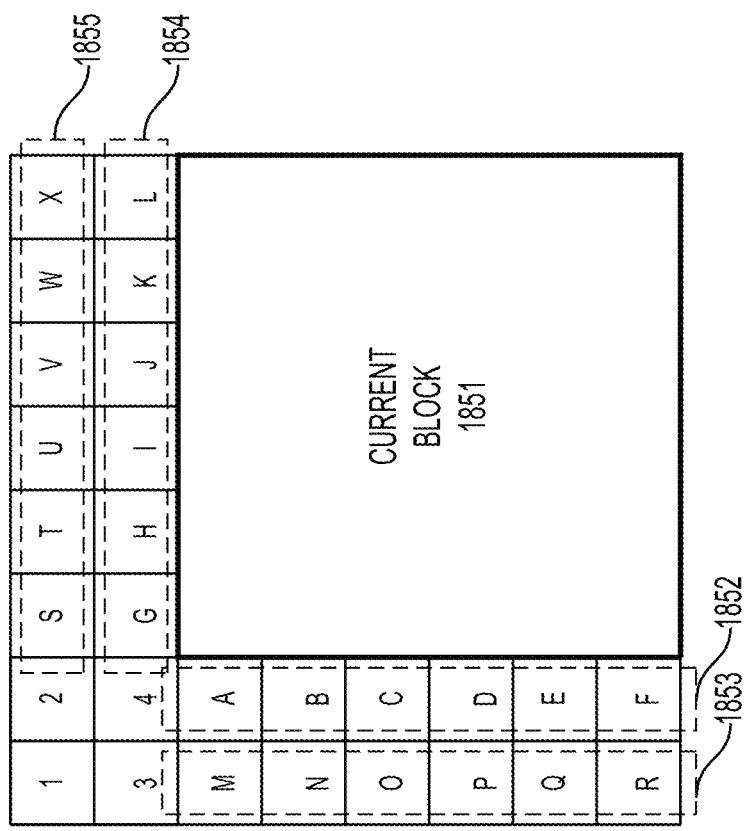
FIG. 18 shows exemplary spatial neighboring samples of a block according to an embodiment of the disclosure.

The neighboring reconstructed sample(s) (e.g., a set of neighboring reconstructed samples) of the block can refer to reconstructed sample(s) (e.g., a group of reconstructed samples) from previously decoded neighboring block(s) in a current picture or reconstructed samples in a previously decoded picture. The previously decoded neighboring block (s) can include one or more neighboring blocks of the block, and the neighboring reconstructed sample(s) are also referred to as the reconstructed sample(s) in the one or more neighboring blocks of the block. The one or more neighboring blocks of the block can be in the current picture or a reconstructed picture (e.g., a reference picture) that is different from the current picture. The neighboring reconstructed sample(s) of the block can include spatial neighboring sample(s) of the block that are in the current picture and/or temporal neighboring sample(s) of the block that are in another picture (e.g., a previously decoded picture) that is different from the current picture. FIG. 18 shows exemplary spatial neighboring samples of a block according to an embodiment of the disclosure. The block is a current block (1851) in a current picture. Samples 1-4 and A-X are spatial neighboring samples of the current block (1851) and are reconstructed already. In an example, the samples 1-4 and A-X are in one or more reconstructed neighboring blocks of the current block (1851). According to aspects of the disclosure, one or more of the samples 1-4 and A-X can be used to determine a transform kernel for the current block (1851).

In an example, the neighboring reconstructed samples of the current block (1851) include the top-left neighboring sample 4, a left neighboring column (1852) including the samples A-F, and a top neighboring row (1854) including the samples G-L, and are used to determine the transform kernel for the current block (1851). In an example, the neighboring reconstructed samples of the current block (1851) include the top-left neighboring samples 1-4, left neighboring columns (1852)-(1853) including the samples A-F and M-R, and top neighboring rows (1854)-(1855) including the samples G-L and S-X, and are used to determine the transform kernel for the current block (1851).

The group of transform sets can include one or more transform sets. Each of the one or more transform sets can include any suitable one or more transform kernels. Thus, the group of transform sets can include transform kernel(s) used in a primary transform, a secondary transform, a tertiary transform, or a transform scheme that is beyond the tertiary transform. The group of transform sets can include transform kernel(s) that are separable transform(s) and/or non-separable transform(s). The group of transform sets can include transform kernel(s) used for a luma block, a chroma block, in the inter prediction, in the intra prediction, and/or the like.

According to aspects of the disclosure, the transform kernel (or the transform candidate) for the block in the current picture can be determined from the group of transform sets based on the reconstructed samples in one or more neighboring blocks of the block. The transform kernel (or the transform candidate) for the block in the current picture can be determined from the group of transform sets based on a feature indicator (e.g., a feature vector $\vec{F}$ or a feature scalar S) extracted from the reconstructed samples in one or more neighboring blocks of the block. Each set of the group of transform sets can include one or more transform candidates for the block. The one or more neighboring blocks can be in the current picture or a reconstructed picture that is different from the current picture. Further, samples of the block can be reconstructed based on the determined transform candidate.

In an embodiment, a feature indicator (e.g., a feature vector $\vec{F}$ or a feature scalar S) of the neighboring reconstructed samples can be extracted from the neighboring reconstructed samples. Accordingly, the transform kernel for the block (e.g., the current block (1851)) can be determined based on the feature indicator. The feature indicator can be a vector (referred to as the feature vector $\vec{F}$) or a scaler (referred to as the feature scalar S). The feature indicator can be extracted based on statistics or statistical analysis of the neighboring reconstructed samples, for example, based on one or more variables associated with the neighboring reconstructed samples. The one or more variables can indicate one or more distributions of samples values of the neighboring reconstructed samples.

In an embodiment, the transform kernel for the block (e.g., the current block (1851)) can be determined based on the neighboring reconstructed sample(s) (e.g., the feature indicator) and prediction mode information for the block. The prediction mode information for the block can indicate information used in predicting the block, such as inter prediction or intra prediction for the block. According to aspects of the disclosure, the prediction mode information for the block can indicate a prediction mode (e.g., an intra prediction mode, an inter prediction mode) for the block. In an example, the transform kernel for the block is determined based on the neighboring reconstructed sample(s) (e.g., the feature indicator) and the prediction mode for the block.

In an example, the block is intra coded or intra predicted, and the prediction mode information is referred to as intra prediction mode information. The prediction mode information (e.g., the intra prediction mode information) for the block can indicate the intra prediction mode used for the block. The intra prediction mode can refer to a prediction mode used for intra prediction of the block, such as a directional mode (or a directional prediction mode) described in FIG. 9, a non-directional prediction mode (e.g., the DC mode, the PAETH mode, the SMOOTH mode, the SMOOTH_V mode, or the SMOOTH_H mode) described in FIG. 10, or a recursive filtering mode described in FIG. 11. The intra prediction mode can also refer to a prediction mode described in the disclosure, a suitable variation of a prediction mode that is described in the disclosure, or a suitable combination of prediction modes described in the disclosure. For example, the intra prediction mode can be combined with multi-line intra prediction described in FIG. 12.

More specifically, a sub-group of transform sets can be selected from the group of transform sets, for example, based on coded information for the block from a coded video bitstream. The coded information for the block can include the prediction mode information that indicates the prediction mode (e.g., the intra prediction mode or the inter prediction mode) for the block. In an embodiment, the sub-group of transform sets can be selected from the group of transform sets based on the prediction mode information (e.g., the prediction mode).

According to aspects of the disclosure, the sub-group of transform sets can be selected from the group of transform sets based on the prediction mode for the block indicated in the coded information for the block. Further, the transform candidate from the sub-group of transform sets can be determined based on the reconstructed samples in the one or more neighboring blocks of the block. For example, the transform candidate from the sub-group of transform sets can be determined based on the feature indicator (e.g., the feature vector $\vec{F}$ or the feature scalar S) extracted from the reconstructed samples in the one or more neighboring blocks of the block.

After the sub-group of transform sets is selected from the group of transform sets, the transform kernel for the block can be further determined based at least on the neighboring reconstructed sample(s) (e.g., the feature indicator) using any suitable method as described below.

In an embodiment, from the selected sub-group of transform sets, a transform set in the selected sub-group of transform sets is identified or selected using the neighboring reconstructed sample(s) of the block (or the reconstructed samples in the one or more neighboring blocks of the block). In an example, the transform set in the selected sub-group of transform sets is identified or selected using the feature indicator (e.g., the feature vector $\vec{F}$ or the feature scalar S) extracted from the reconstructed samples in the one or more neighboring blocks of the block. Further, the transform kernel (or the transform candidate) for the block can be determined (e.g., selected) from the identified (or selected) transform set based on a first index. The coded information can indicate (e.g., include) the first index. The first index can be signaled in the coded video bitstream.

In an embodiment, from the selected sub-group of transform sets, a transform set in the selected sub-group of transform sets is selected based on a second index. The coded information can indicate (e.g., include) the second index. The second index can be signaled in the coded video bitstream. Further, the transform kernel (or the transform candidate) for the block from the selected transform set can be determined (e.g., selected) based on the neighboring reconstructed sample(s) (or the reconstructed samples in the one or more neighboring blocks of the block) (e.g., the feature indicator) of the block. In an example, the transform kernel (or transform candidate) in the selected transform set can be determined using the feature indicator (e.g., the feature vector $\vec{F}$ or the feature scalar S) of the block.

In an embodiment, from the selected sub-group of transform sets, the transform kernel (or the transform candidate) for the block is determined (or identified) implicitly based on the neighboring reconstructed sample(s) of the block. In an example, the transform kernel (or the transform candidate) is determined (or identified) implicitly using the feature indicator (e.g., the feature vector $\vec{F}$ or the feature scalar S) of the block from the selected sub-group of transform sets and without using an index signaled in the coded video bitstream.

The feature indicator (e.g., the feature vector $\vec{F}$ or the feature scalar S) of the block can be determined (e.g., derived) based on the neighboring reconstructed sample(s). According to aspects to the disclosure, the feature indicator (e.g., the feature vector $\vec{F}$ or the feature scalar S) of the block can be determined or derived from a statistical analysis of the neighboring reconstructed samples of the block (or the reconstructed samples in the one or more neighboring blocks of the block). As described above, one of (i) determining a transform set from the sub-group of transform sets based on the feature indicator (e.g., the feature vector $\vec{F}$ or the feature scalar S), (ii) determining the transform candidate from the sub-group of transform sets based on the feature indicator (e.g., the feature vector $\vec{F}$ or the feature scalar S), or (iii) selecting the transform set from the sub-group of transform sets based on an index in the coded information and determining the transform candidate from the selected transform set based on the feature indicator (e.g., the feature vector $\vec{F}$ or the feature scalar S) can be performed.

In an embodiment, a single variable X can be used to denote the neighboring reconstructed samples, and the feature indicator of the block is the feature scalar S of the block. The variable X can indicate samples values of the neighboring reconstructed samples. In an example, the variable X is an array including the samples values of the neighboring reconstructed samples, and reflects a distribution of the samples values across the neighboring reconstructed samples. The feature scalar S can indicate a statistics of the samples values. The feature scalar S can include but is not limited to a scalar quantitative measurement of the variable X, such as a mean (or a first moment) of the variable X, a variance (or a second moment) of the variable X, a skewness (or a third moment) of the variable X, that can be obtained from the neighboring reconstructed samples. In an example, the variable X is referred to as a random variable X.

In an example, the feature indicator is the feature scalar S. The feature scalar S is determined as a moment (e.g., the first moment, the second moment, the third moment, or the like) of the variable X that indicates the sample values of reconstructed samples in the one or more neighboring blocks of the block.

Examples of the variable X are shown in FIG. 18. In an example, the variable X includes the reconstructed neighboring samples that are adjacent to the current block (1851), including the sample 4, the left neighboring column (1852), and the top neighboring row (1854). In an example, the variable X includes the reconstructed neighboring samples 1 to 4 and A to X.

In an embodiment, multiple variables (e.g., two variables Y and Z) can be used to denote different sets (e.g., a first set for Y and a second set for Z) of the neighboring reconstructed samples (if available), respectively, and the feature indicator of the block is the feature vector $\vec{F}$ of the block. The multiple variables can indicate samples values of the different sets of the neighboring reconstructed samples, respectively. In an example, the variable Y is an array including first samples values of the first set of the neighboring reconstructed samples, and reflects a distribution of the first samples values of the first set of the neighboring reconstructed samples. The variable Z is an array including second samples values of the second set of the neighboring reconstructed samples, and reflects a distribution of the second samples values of the second set of the neighboring reconstructed samples. The feature vector $\vec{F}$ can indicate a statistics of the multiple variables.

The feature vector $\vec{F}$ can include but is not limited to a statistical analysis of the multiple variables that can be obtained from the neighboring reconstructed samples, such as a joint variability measurement of the multiple variables (e.g., a covariance or a second moment of the multiple variables (e.g., the two variables Y and Z)). In an example, the multiple variables (e.g., two variables Y and Z) are referred to as random variables.

Examples of the multiple variables Y and Z are shown in FIG. 18. In an example, the variable Y includes the left neighboring column (1852), and the variable Z includes the top neighboring row (1854). In an example, one of the variables Y and Z includes the top-left sample 4.

In an example, the feature indicator is the feature vector $\vec{F}$. The feature vector $\vec{F}$ is determined as a joint variability of variables (e.g., the variables Y and Z) that respectively indicate samples values of reconstructed samples of a neighboring column (e.g., the left neighboring column (1852)) on a left side of the block (e.g., the current block (1851)) and samples values of reconstructed samples of a neighboring row (e.g., the top neighboring row (1854)) on a top side of the block (e.g., the current block (1851)).

In an example, the variable Y includes the left neighboring columns (1852)-(1853), and the variable Z includes the top neighboring rows (1854)-(1855). In an example, one of the variables Y and Z includes the top-left samples 1 to 4.

According to aspects of the disclosure, when the feature indicator is used in determining a transform kernel for the block or a transform set that includes the transform kernel for the block, the transform kernel or the transform set can be determined based on the feature indicator and a threshold. The threshold can be selected from a pre-defined set of thresholds. The transform kernel or the transform set can be determined based on the feature indicator and the threshold using any suitable method. Some exemplary methods are described below. As described above, according to aspects of the disclosure, the sub-group of transform sets is selected from the group of transform sets, for example, based on the prediction mode information. Subsequently, in an example, the transform set is identified from the selected sub-group of transform sets using the feature indicator of the block and the threshold. In another example, a transform set in the selected sub-group of transform sets is selected using an index (e.g., the second index) signaled in the coded video bitstream, and the transform kernel for the block from the selected transform set can be determined (e.g., selected) using the feature indicator of the block and the threshold. In another example, the transform kernel is identified implicitly using the feature indicator and the threshold from the selected sub-group of transform sets.

A set of thresholds (denoted as $K_s$) can be pre-defined, for example, for classification purposes. In an example, one of (i) determining the transform set from the sub-group of transform sets based on the moment of the variable X and the threshold selected from the pre-defined set of thresholds $K_s$, (ii) determining the transform candidate from the sub-group of transform sets based on the moment of the variable X and the threshold, or (iii) selecting the transform set from the sub-group of transform sets based on the index in the coded information and determining the transform candidate from the selected transform set based on the moment of the variable X and the threshold can be performed.

In an embodiment, the feature scalar S is used for identifying the transform set that includes the transform kernel for the block or for identifying the transform kernel for the block, for example, from the selected the sub-group of transform sets as described above. The set of thresholds $K_s$ can include one or more first thresholds (or first threshold values).

In an example, the feature scalar S is a quantitative measurement of the variable X, such as the mean, the variance, the skewness, or the like of the variable X. For example, the feature scalar S is the moment of the variable X. The moment of the variable can be one of a first moment (or the mean) of the variable X, a second moment (or the variance) of the variable X, or a third moment (e.g., the skewness) of the variable X.

Each prediction mode (e.g., an intra prediction mode or an inter prediction mode) can correspond to a unique subset of thresholds $K_s'$ that is in the set of thresholds $K_s$, for example, indicating an injective mapping between multiple prediction modes and multiple subsets of thresholds that are in the set of thresholds Ks. The prediction mode for the block can be one of the multiple prediction modes. A mapping between each prediction mode and the corresponding subset of thresholds $K_s'$ is an injective mapping. For example, the set of thresholds $K_s$ includes a subset of thresholds $K_{s1}'$ corresponding to a first prediction mode and a subset of thresholds $K_{s2}'$ corresponding to a second prediction mode, and no element or no threshold in the subset of thresholds $K_{s1}'$ is identical to an element or a threshold in the subset of thresholds $K_{s2}'$.

In an example, the feature scalar S is the quantitative measurement of the variable X, such as the mean, the variance, the skewness, or the like of the variable X. Each prediction mode can correspond to any subset of thresholds $K_s'$ in the set of thresholds $K_s$. A mapping between each prediction mode and the corresponding subset of thresholds $K_s'$ in the set of thresholds $K_s$ is a non-injective mapping. In an example, multiple prediction modes (e.g., the first prediction mode and the second prediction mode) can correspond to a same subset of thresholds $K_s'$ in the set of thresholds $K_s$. In an example, the set of thresholds $K_s$ includes a subset of thresholds $K_{s3}'$ corresponding to the first prediction mode and a subset of thresholds $K_{s4}'$ corresponding to the second prediction mode, and an element (or a threshold) in the subset of thresholds $K_{s3}'$ is identical to an element (or a threshold) in the subset of thresholds $K_{s4}'$. In an example, the set of thresholds $K_s$ is a single element set.

In an embodiment, element(s) of a subset of thresholds $K_s'$ in the set of thresholds $K_s$ are threshold value(s) that are dependent on a quantization index (or a corresponding quantization step size that is associated with the quantization index). In general, each quantization index can correspond to a unique quantization step size. The above description is applicable when the mapping between each prediction mode and the corresponding subset of thresholds $K_s'$ in the set of thresholds $K_s$ is non-injective or injective.

In an embodiment, only one element of a subset of thresholds $K_s'$ in the set of thresholds $K_s$ corresponding to a particular quantization index (or a corresponding quantization step size) is defined. Remaining element(s), if any, in the subset of thresholds $K_s'$ can be derived using a mapping function. The mapping function can be linear or non-linear. The mapping function can be pre-defined and used by an encoder and/or a decoder. The remaining element(s) in the subset of thresholds $K_s'$ can correspond to different quantization indices or (or corresponding quantization step sizes). The above description is applicable when the mapping between each prediction mode and the corresponding subset of thresholds $K_s'$ in the set of thresholds $K_s$ is non-injective or injective.

In an embodiment, a look-up table can be used to determine a subset of thresholds $K_s'$. For example, the look-up table is used to select elements for the subset of thresholds $K_s'$ based on the prediction mode and/or the quantization index. In an example, the look-up table includes a relationship of prediction modes, quantization indices (or corresponding quantization step sizes), and threshold values. The look-up table can be traversed to determine the subset of thresholds $K_s'$ (e.g., to select the elements for the subset of thresholds $K_s'$) using the prediction mode (e.g., an intra prediction mode or an inter prediction mode) and/or the quantization indices (or the corresponding quantization step sizes). The above description is applicable when the mapping between each prediction mode and the corresponding subset of thresholds $K_s'$ in the set of thresholds $K_s$ is non-injective or injective.

In an embodiment, a mapping from a quantization index (or a corresponding quantization step size) to a threshold value is a linear mapping. Parameters used in the linear mapping, such as a slope and an intercept, can be pre-defined or derived using the coded information for the block. The coded information can include but is not limited to a block size, a quantization index (or a corresponding quantization step size), the prediction mode (e.g., an intra prediction mode or an inter prediction mode). The linear mapping (e.g., the parameters used in the linear mapping) can be pre-defined or derived based on one or a combination of the block size, the quantization index (or the corresponding quantization step size), the prediction mode. The description can be suitably adapted if the mapping from a quantization index (or a corresponding quantization step size) to a threshold value is a nonlinear mapping. The above description is applicable when the mapping between each prediction mode and the corresponding subset of thresholds $K_s'$ in the set of thresholds $K_s$ is non-injective or injective.

As described above, the feature scalar S can be used for identifying the transform set including the transform kernel for the block or for identifying the transform kernel for the block, and the set of thresholds $K_s$ can include one or more first threshold values. In an embodiment, the selection of a threshold value, for example, from the set of thresholds $K_s$ depends on the block size of the block. In an embodiment, the selection of the threshold value, for example, from the set of thresholds $K_s$ depends on quantization parameter(s) used in quantization, such as the quantization index (or the corresponding quantization step size). In an embodiment, the selection of the threshold value, for example, from the set of thresholds $K_s$ depends on the prediction mode (e.g., an intra prediction mode and/or an inter prediction mode).

In an embodiment, the feature vector $\vec{F}$ is used for identifying the transform kernel for the block or for identifying the transform set including the transform kernel for the block. A set of classification vectors $\vec{C}$ and a set of thresholds (denoted as $K_v$) that is associated with the set of classification vectors $\vec{C}$ can be pre-defined for classification purposes. The set of thresholds $K_v$ can include one or more second threshold or second threshold values.

In an example, for the feature vector $\vec{F}$, each prediction mode (e.g., an intra prediction mode or an inter prediction mode) can correspond to a unique subset of classification vectors $\vec{C}'$ in the set of classification vectors $\vec{C}$ and a unique subset of thresholds $K_v'$ in the set of thresholds $K_v$. The unique subset of classification vectors $\vec{C}'$ corresponds to the unique subset of thresholds $K_v'$. A mapping between each prediction mode and the corresponding subset of classification vectors $\vec{C}'$ (along with the associated subset of thresholds $K_v'$) is an injective mapping. For example, the set of thresholds $K_v$ includes a subset of thresholds $K_{v1}'$ and a subset of thresholds $K_{v2}'$. The set of classification vectors $\vec{C}$ includes a subset of classification vectors $\overrightarrow{C1}'$ and a subset of classification vectors $\overrightarrow{C2}'$. One prediction mode corresponds to the subset of thresholds $K_{v1}'$ and the subset of classification vectors $\overrightarrow{C1}'$, and another prediction mode corresponds to the subset of thresholds $K_{v2}'$ and the subset of classification vectors $\overrightarrow{C2}'$. No threshold in the subset of thresholds $K_{v1}'$ is identical to a threshold in the subset of thresholds $K_{v2}'$, and no classification vector in the subset of classification vectors $\overrightarrow{C1}'$ is identical to a classification vector in the subset of classification vectors $\overrightarrow{C2}'$.

In an example, each prediction mode (e.g., an intra prediction mode or an inter prediction mode) can correspond to any subset of thresholds $K_v'$ in the set of thresholds $K_v$ and any corresponding subset of classification vectors $\vec{C}'$ in the set of classification vectors $\vec{C}$. A mapping between each prediction mode and the corresponding subset of thresholds $K_v'$ in the set of thresholds $K_v$ is a non-injective mapping. A mapping between each prediction mode and the corresponding subsets of classification vectors $\vec{C}'$ in the set of classification vectors $\vec{C}$ is a non-injective mapping. In an example, a mapping between each prediction mode and the corresponding subset of thresholds $K_v'$ along with the corresponding subsets of classification vectors $\vec{C}'$ is a non-injective mapping. In an example, multiple prediction modes can correspond to a same subset of thresholds $K_v'$ (and a corresponding subset of classification vectors $\vec{C}'$ that is associated with the subset of thresholds $K_v'$).

In an embodiment, element(s) of a subset of thresholds $K_v'$ in the set of thresholds $K_v$ are threshold value(s) that are dependent on a quantization index (or a corresponding quantization step size). Likewise, element(s) of a corresponding subset of classification vectors $\vec{C}'$ in the set of classification vectors $\vec{C}$ are classification vector(s) that are dependent on a quantization index (or a corresponding quantization step size). The above description is applicable when the mapping between (i) each prediction mode and (ii) the corresponding subset of thresholds $K_v'$ and the subset of classification vectors $\vec{C}'$ that corresponds to the subset of thresholds $K_v'$ is non-injective or injective.

In an embodiment, only one element of a subset of thresholds $K_v'$ in the set of thresholds $K_s$ and only one element of a corresponding subset of classification vectors $\vec{C}'$ in the set of classification vectors $\vec{C}$ that correspond to a particular quantization index (or a quantization step size corresponding to the particular quantization index) is defined. Remaining element(s), if any, in the subset of thresholds $K_v'$ and remaining element(s), if any, in the subset of classification vectors $\vec{C}'$ can be derived using a mapping function. The mapping function can be linear or non-linear. The mapping function can be pre-defined and used by an encoder and/or a decoder. The remaining element(s) in the subset of thresholds $K_v'$ and the remaining element(s) in the corresponding subset of classification vectors $\vec{C}'$ can correspond to different quantization indices or (or quantization step sizes corresponding to the quantization indices). The above description is applicable when the mapping between (i) each prediction mode and (ii) the corresponding subset of thresholds $K_v'$ and the subset of classification vectors $\vec{C}'$ that corresponds to the subset of thresholds $K_v'$ is non-injective or injective.

In an embodiment, a look-up table can be used to determine a subset of thresholds $K_v'$, by selecting elements for the subset of thresholds $K_v'$ and to determine a corresponding subset of classification vectors $\vec{C}'$, by selecting elements for the subset of classification vectors $\vec{C}'$. In an example, the look-up table includes a relationship of prediction modes, quantization indices (or quantization step sizes corresponding to the quantization indices), and threshold values, and classification vectors. The look-up table can be traversed to determine the subset of thresholds $K_v'$ (e.g., to select the elements for the subset of thresholds $K_v'$) and the corresponding subset of classification vectors $\vec{C}'$ (e.g., to select elements for the subset of classification vectors $\vec{C}'$) using the prediction mode (e.g., an intra prediction mode or an inter prediction mode) and/or the quantization indices (or the quantization step sizes corresponding to the quantization indices). The above description is applicable when the mapping between (i) each prediction mode and (ii) the corresponding subset of thresholds $K_v'$ and the subset of classification vectors $\vec{C}'$ that corresponds to the subset of thresholds $K_v'$ is non-injective or injective.

In an embodiment, the feature vector $\vec{F}$ is obtained from the neighboring reconstructed samples of the block. Further, a classification vector (e.g., an element $\{\overrightarrow{C'}\}$ in the subset $\vec{C}'$) is obtained from the subset of classification vectors $\vec{C}'$ and a threshold (e.g., an element $\{Kv'\}$ in the subset of thresholds $K_v'$) corresponding to the classification vector is obtained from the subset of thresholds $K_v'$ using the prediction mode information and the quantization index (or the corresponding quantization step size). Note that { } (e.g., $\{\overrightarrow{C'}\}$) represents an element of a corresponding set or subset (e.g., the subset of classification vectors $\overrightarrow{C'}$). The prediction mode information can indicate the prediction mode (e.g., the intra prediction mode or the inter prediction mode). A distance between two vectors, i.e., the feature vector $\overrightarrow{F}$ and the classification vector $\{\overrightarrow{C'}\}$ can be calculated and then compared to the threshold $\{Kv'\}$. Thus, the transform set or the transform candidate can be identified based on the comparison of the threshold $\{Kv'\}$ with the distance that is between the feature vector $\overrightarrow{F}$ and the classification vector $\{\overrightarrow{C'}\}$.

In an example, the one of (i) determining the transform set from the sub-group of transform sets based on a comparison of the distance and the threshold (e.g., $\{Kv'\}$) selected from the subset of thresholds $K_v'$ included in the set of thresholds $K_v$, (ii) determining the transform candidate from the sub-group of transform sets based on the comparison of the distance and the threshold (e.g., $\{Kv'\}$), or (iii) selecting the transform set from the sub-group of transform sets based on the index in the coded information and determining the transform candidate from the selected transform set based on the comparison of the distance and the threshold (e.g., $\{Kv'\}$) can be performed. The distance can be calculated between the feature vector $\overrightarrow{F}$ (e.g., the joint variability of the variables) and the classification vector $\{\overrightarrow{C'}\}$ selected from the pre-defined set of classification vectors $\overrightarrow{C}$. In an example, the distance is calculated between the feature vector $\overrightarrow{F}$ (e.g., the joint variability of the variables) and the classification vector $\{\overrightarrow{C'}\}$ selected from the subset of classification vectors $\overrightarrow{C'}$ included in the set of classification vectors $\overrightarrow{C}$.

In an example, the distance can be determined as, but is not limited to, a dot product between the two vectors, i.e., the feature vector $\overrightarrow{F}$ and the classification vector $\{\overrightarrow{C'}\}$. Alternatively, the distance can be determined as $\Sigma_{i=0}^{N-1} |\overrightarrow{F}(i) - \overrightarrow{C'}(i)|^{\alpha}$, where the parameter $\alpha$ is a pre-defined constant and the parameter N indicates a dimension (e.g., a size) of the feature vector $\overrightarrow{F}$ and the classification vector $\{\overrightarrow{C'}\}$.

In one embodiment, the comparison can determine, but is not limited to, (i) if the distance is less than or equal to the threshold (e.g., $\overrightarrow{F} \cdot \{\overrightarrow{C'}\} \leq \{Kv'\}$) or (ii) if the distance is larger than or equal to the threshold (e.g., $\overrightarrow{F} \cdot \{\overrightarrow{C'}\} \geq \{Kv'\}$) wherein { } represents an element of the corresponding set.

In some embodiments, using the neighboring reconstructed samples, such as the feature indicator of the neighboring reconstructed samples, to select the transform candidate from a sub-group of transform sets can be restricted. For certain sub-groups of transform sets selected using the coded information, such as the prediction mode (e.g., the intra prediction mode, the inter prediction mode) for the block, the transform candidate or the transform kernel identification process does not use the feature indicator (e.g., the feature vector $\overrightarrow{F}$ or the feature scalar S) of the neighboring reconstructed samples. Instead, the transform candidate can be identified by one or more associated indices signaled in the coded video bitstream. In an example, each of the certain sub-group of transform sets has a reduced number of available transform sets and/or transform kernels.

In an example, the restriction described above is applicable, but is not limited to, certain prediction modes, such as the vertical SMOOTH mode SMOOTH_V and the horizontal SMOOTH mode SMOOTH_H. Thus, for the certain sub-groups of transform sets that are selected based on the certain prediction modes (e.g., SMOOTH_V and SMOOTH_H), the transform candidate for the block can be identified by the one or more associated indices signaled in the coded video bitstream and is not determined based on the feature indicator of the block.

Figure 19:
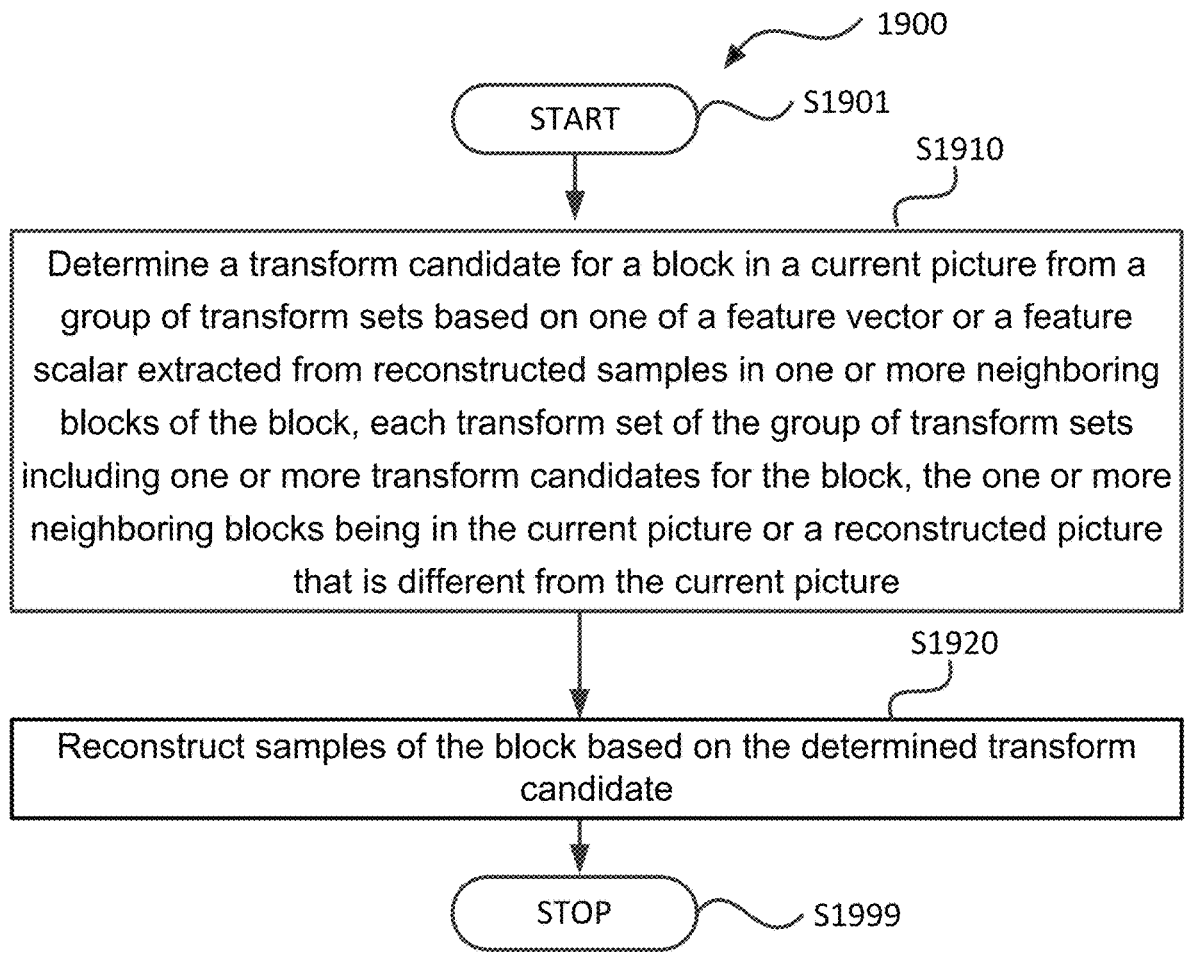
FIG. 19 shows a flow chart outlining a process (1900) according to an embodiment of the disclosure.

FIG. 19 shows a flow chart outlining a process (1900) according to an embodiment of the disclosure. The process (1900) can be used in the reconstruction of a block, such as a CB, a CU, a PB, a TB, a TU, a luma block (e.g., a luma CB or a luma TB), a chroma block (e.g., a chroma CB or a chroma TB), or the like. In various embodiments, the process (1900) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901) and proceeds to (S1910).

At (S1910), a transform candidate for a block in a current picture can be determined from a group of transform sets based on reconstructed samples in one or more neighboring blocks of the block, such as a feature indicator (e.g., one of a feature vector $\overrightarrow{F}$ or a feature scalar S) extracted from the reconstructed samples in the one or more neighboring blocks of the block. Each transform set of the group of transform sets can include one or more transform candidates for the block. The one or more neighboring blocks can be in the current picture or a reconstructed picture that is different from the current picture.

In an embodiment, a sub-group of transform sets can be selected from the group of transform sets based on a prediction mode (e.g., an intra prediction mode, an inter prediction mode) for the block indicated in coded information for the block. The transform candidate can be determined from the sub-group of transform sets based on the feature indicator (e.g., the one of the feature vector $\overrightarrow{F}$ or the feature scalar S) extracted from the reconstructed samples in the one or more neighboring blocks of the block.

In an example, one transform set of the sub-group of transform sets is selected based on the feature indicator (e.g., the one of the feature vector $\overrightarrow{F}$ or the feature scalar S) extracted from the reconstructed samples in the one or more neighboring blocks of the block. The transform candidate for the block can be determined from the selected one transform set of the sub-group of transform sets based on a first index signaled in the coded information.

In an example, one transform set of the sub-group of transform sets is selected based on a second index signaled in the coded information. The transform candidate for the block can be determined from the selected one transform set of the sub-group of transform sets based on the feature indicator (e.g., the one of the feature vector $\overrightarrow{F}$ or the feature scalar S) extracted from the reconstructed samples in the one or more neighboring blocks of the block.

In an example, the transform candidate is implicitly determined from the sub-group of transform sets based on the feature indicator (e.g., the one of the feature vector $\vec{F}$ or the feature scalar S) extracted from the reconstructed samples in the one or more neighboring blocks of the block.

In an embodiment, the feature indicator (e.g., the feature vector $\vec{F}$ or the feature scaler S) is determined based on a statistical analysis of the reconstructed samples in the one or more neighboring blocks of the block. Further, one of (i) determining the transform set from the sub-group of transform sets based on the feature indicator (e.g., the feature vector $\vec{F}$ or the feature scaler S), (ii) determining the transform candidate from the sub-group of transform sets based on the feature indicator (e.g., the feature vector $\vec{F}$ or the feature scaler S), or (iii) selecting the transform set from the sub-group of transform sets based on the second index in the coded information and determining the transform candidate from the selected transform set based on the feature indicator (e.g., the feature vector $\vec{F}$ or the feature scaler S) can be performed.

In an example, the feature indicator is the feature scaler S and is determined as a moment of a variable that indicates sample values of the reconstructed samples in the one or more neighboring blocks of the block. A set of thresholds $K_s$ can be pre-defined. Accordingly, one of (i) determining the transform set from the sub-group of transform sets based on the moment of the variable and a threshold selected from the set of thresholds $K_s$, (ii) determining the transform candidate from the sub-group of transform sets based on the moment of the variable and the threshold, or (iii) selecting the transform set from the sub-group of transform sets based on the second index in the coded information and determining the transform candidate from the selected transform set based on the moment of the variable and the threshold can be performed.

In an example, the moment of the variable is one of a first moment of the variable, a second moment of the variable, or a third moment of the variable. The prediction mode for the block is one of multiple prediction modes. Each of the multiple prediction modes corresponds to a unique subset of thresholds Ks' that is in the set of thresholds Ks indicating an injective mapping between the multiple prediction modes and multiple subsets of thresholds that are in the set of thresholds Ks.

In an example, the threshold is selected from the set of thresholds Ks based on one of (i) a block size of the block, (ii) a quantization parameter, or (iii) the prediction mode for the block.

In an example, the feature indicator is the feature vector $\vec{F}$ and is determined as a joint variability of variables that respectively indicate sample values of reconstructed samples of a neighboring column on a left side of the block and sample values of reconstructed samples of a neighboring row on a top side of the block. A set of classification vectors $\vec{C}$ and a set of thresholds Kv that is associated with the set of classification vectors $\vec{C}$ are pre-defined. A distance is calculated between the joint variability of the variables and a classification vector selected from a subset of classification vectors $\vec{C}'$ included in the set of classification vectors $\vec{C}$. Accordingly, the one of (i) determining the transform set from the sub-group of transform sets based on a comparison of the distance and a threshold that is selected from a subset of $K_v'$ included in the set of thresholds $K_v$, (ii) determining the transform candidate from the sub-group of transform sets based on the comparison of the distance and the threshold $K_v$, or (iii) selecting the transform set from the sub-group of transform sets based on the second index in the coded information and determining the transform candidate from the selected transform set based on the comparison of the distance and the threshold can be performed.

At (S1920), samples of the block can be reconstructed based on the determined transform candidate.

The process (1900) can be suitably adapted. Step(s) in the process (1900) can be modified and/or omitted. Additional step(s) can be added. Any suitable order of implementation can be used.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
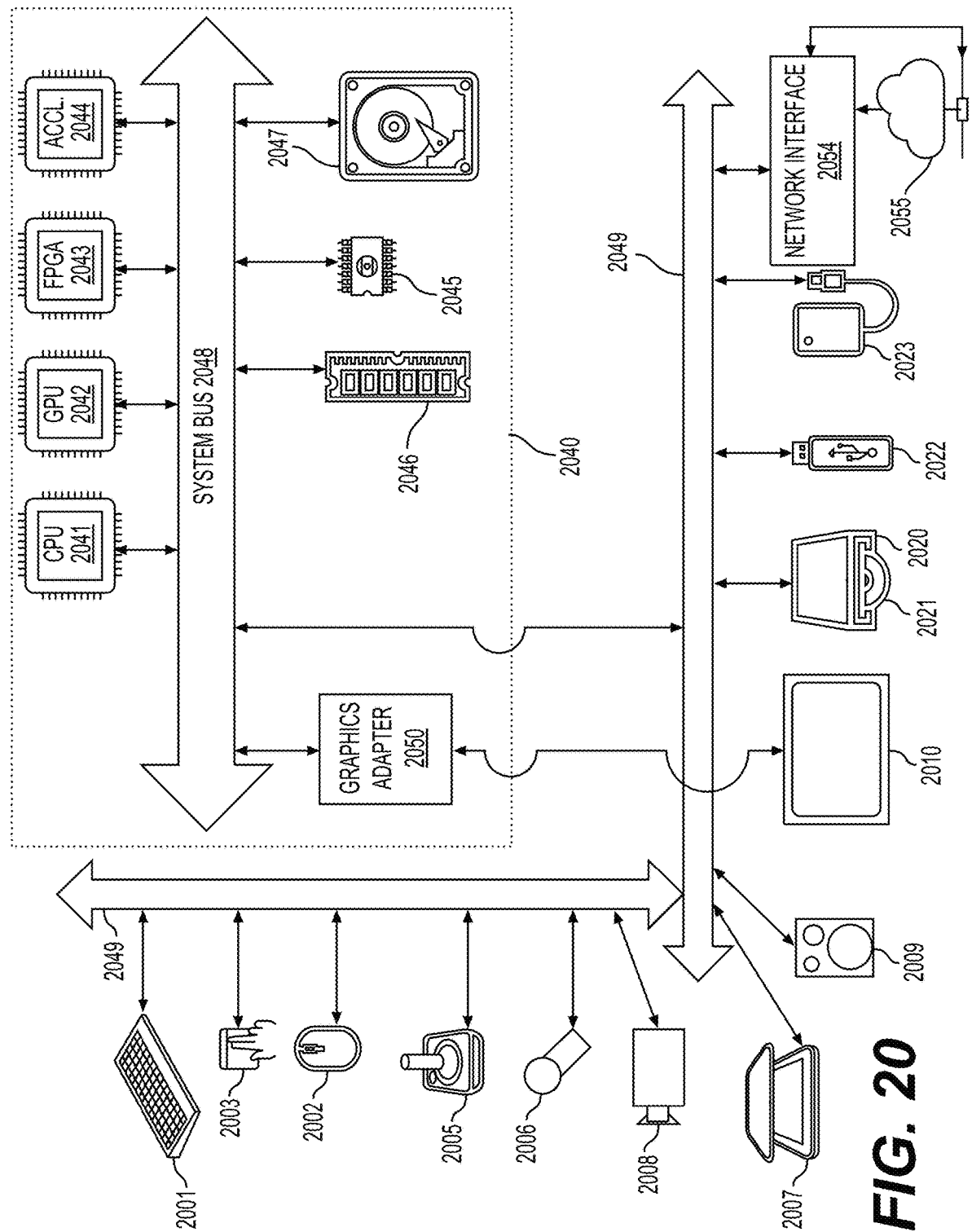
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding

BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    determining one of a feature vector $\vec{F}$ or a feature scalar S based on a statistical analysis of reconstructed samples in one or more neighboring blocks of a block in a current picture;
    selecting a sub-group of transform sets from a group of transform sets based on a prediction mode for the block, the prediction mode being indicated in coded information for the block;
    determining a transform candidate for the block, each transform set of the group of transform sets including one or more transform candidates for the block, the one or more neighboring blocks being in the current picture or a reconstructed picture that is different from the current picture; and
    reconstructing samples of the block based on the determined transform candidate,
    wherein the transform candidate is determined by performing one of
        (i) determining a transform set from the sub-group of transform sets based on the one of the feature vector $\vec{F}$ or the feature scalar S,
        (ii) determining the transform candidate from the sub-group of transform sets based on the one of the feature vector $\vec{F}$ or the feature scalar S, or
        (iii) selecting the transform set from the sub-group of transform sets based on an index in the coded information and determining the transform candidate from the selected transform set based on the one of the feature vector $\vec{F}$ or the feature scalar S.

2. The method of claim 1, wherein the determining further comprises:
    determining the transform candidate from the sub-group of transform sets based on the one of the feature vector $\vec{F}$ or the feature scalar S extracted from the reconstructed samples in the one or more neighboring blocks of the block.

3. The method of claim 2, wherein the determining the transform candidate from the sub-group of transform sets further comprises:
    selecting one transform set of the sub-group of transform sets based on the one of the feature vector $\vec{F}$ or the feature scalar S extracted from the reconstructed samples in the one or more neighboring blocks of the block; and
    determining, based on an index signaled in the coded information, the transform candidate for the block from the selected one transform set of the sub-group of transform sets.

4. The method of claim 2, wherein the determining the transform candidate from the sub-group of transform sets further comprises:
    selecting one transform set of the sub-group of transform sets based on an index signaled in the coded information; and
    determining, based on the one of the feature vector $\vec{F}$ or the feature scalar S extracted from the reconstructed samples in the one or more neighboring blocks of the block, the transform candidate for the block from the selected one transform set of the sub-group of transform sets.

5. The method of claim 2, wherein the determining further comprises:
    implicitly determining the transform candidate from the sub-group of transform sets based on the one of the feature vector $\vec{F}$ or the feature scalar S extracted from the reconstructed samples in the one or more neighboring blocks of the block.

6. The method of claim 1, wherein
    the one of the feature vector $\vec{F}$ or the feature scalar S is the feature scalar S; and
    the determining the one of the feature vector $\vec{F}$ or the feature scalar S further includes determining the feature scalar S as a moment of a variable that indicates sample values of the reconstructed samples in the one or more neighboring blocks of the block.

7. The method of claim 6, wherein
    a set of thresholds $K_s$ are pre-defined; and
    the performing includes performing one of
        (i) determining the transform set from the sub-group of transform sets based on the moment of the variable and a threshold from the set of thresholds $K_s$,
        (ii) determining the transform candidate from the sub-group of transform sets based on the moment of the variable and the threshold, or (iii) selecting the transform set from the sub-group of transform sets based on the index in the coded information and determining the transform candidate from the selected transform set based on the moment of the variable and the threshold.

8. The method of claim 7, wherein
the moment of the variable is one of a first moment of the variable, a second moment of the variable, or a third moment of the variable,
the prediction mode for the block is one of multiple prediction modes, and
each of the multiple prediction modes corresponds to a unique subset of thresholds $K_s'$ that is in the set of thresholds $K_s$ indicating an injective mapping between the multiple prediction modes and multiple subsets of thresholds that are in the set of thresholds $K_s$.

9. The method of claim 7, further comprising:
selecting the threshold from the set of thresholds $K_s$ based on one of (i) a block size of the block, (ii) a quantization parameter, or (iii) the prediction mode for the block.

10. The method of claim 1, wherein
the one of the feature vector $\vec{F}$ or the feature scalar S is the feature vector $\vec{F}$; and
the determining the one of the feature vector $\vec{F}$ or the feature scalar S further includes determining the feature vector $\vec{F}$ as a joint variability of variables that respectively indicate sample values of reconstructed samples of a neighboring column on a left side of the block and sample values of reconstructed samples of a neighboring row on a top side of the block.

11. The method of claim 10, wherein a set of classification vectors $\vec{C}$ and a set of thresholds $K_v$ that is associated with the set of classification vectors $\vec{C}$ are pre-defined,
the method further includes calculating a distance between the joint variability of the variables and a classification vector selected from a subset of classification vectors $\vec{C'}$ included in the set of classification vectors $\vec{C}$, and
the performing includes performing one of
(i) determining the transform set from the sub-group of transform sets based on a comparison of the distance and a threshold selected from a subset of thresholds $K_v'$ included in the set of thresholds $K_v$,
(ii) determining the transform candidate from the sub-group of transform sets based on the comparison of the distance and the threshold, or
(iii) selecting the transform set from the sub-group of transform sets based on the index in the coded information and determining the transform candidate from the selected transform set based on the comparison of the distance and the threshold.

12. An apparatus for video decoding, comprising:
processing circuitry configured to:
determine one of a feature vector $\vec{F}$ or a feature scalar S based on a statistical analysis of reconstructed samples in one or more neighboring blocks of a block in a current picture;
select a sub-group of transform sets from a group of transform sets based on a prediction mode for the block, the prediction mode being indicated in coded information for the block;
determine a transform candidate for the block, each transform set of the group of transform sets including one or more transform candidates for the block, the one or more neighboring blocks being in the current picture or a reconstructed picture that is different from the current picture; and
reconstruct samples of the block based on the determined transform candidate,
wherein the processing circuitry is configured to determine the transform candidate by performing one of
(i) determining a transform set from the sub-group of transform sets based on the one of the feature vector $\vec{F}$ or the feature scalar S,
(ii) determining the transform candidate from the sub-group of transform sets based on the one of the feature vector $\vec{F}$ or the feature scalar S, or
(iii) selecting the transform set from the sub-group of transform sets based on an index in the coded information and determining the transform candidate from the selected transform set based on the one of the feature vector $\vec{F}$ or the feature scalar S.

13. The apparatus of claim 12, wherein the processing circuitry is configured to:
determine the transform candidate from the sub-group of transform sets based on the one of the feature vector $\vec{F}$ or the feature scalar S extracted from the reconstructed samples in the one or more neighboring blocks of the block.

14. The apparatus of claim 13, wherein the processing circuitry is configured to:
select one transform set of the sub-group of transform sets based on the one of the feature vector $\vec{F}$ or the feature scalar S extracted from the reconstructed samples in the one or more neighboring blocks of the block; and
determine, based on an index signaled in the coded information, the transform candidate for the block from the selected one transform set of the sub-group of transform sets.

15. The apparatus of claim 12, wherein
the one of the feature vector $\vec{F}$ or the feature scalar S is the feature scalar S; and
the processing circuitry is configured to determine the feature scalar S as a moment of a variable that indicates sample values of the reconstructed samples in the one or more neighboring blocks of the block.

16. The apparatus of claim 15, wherein
a set of thresholds $K_s$ are pre-defined; and
the processing circuitry is configured to perform one of
(i) determining the transform set from the sub-group of transform sets based on the moment of the variable and a threshold from the set of thresholds $K_s$,
(ii) determining the transform candidate from the sub-group of transform sets based on the moment of the variable and the threshold, or
(iii) selecting the transform set from the sub-group of transform sets based on the index in the coded information and determining the transform candidate from the selected transform set based on the moment of the variable and the threshold.

17. The apparatus of claim 12, wherein
the one of the feature vector $\vec{F}$ or the feature scalar S is the feature vector $\vec{F}$; and
the processing circuitry is configured to:
determine the feature vector $\vec{F}$ as a joint variability of variables that respectively indicate sample values of reconstructed samples of a neighboring column on a left side of the block and sample values of reconstructed samples of a neighboring row on a top side of the block.

18. The apparatus of claim 17, wherein a set of classification vectors $\vec{C}$ and a set of thresholds $K_v$ that is associated with the set of classification vectors $\vec{C}$ are pre-defined, the processing circuitry is configured to:

calculate a distance between the joint variability of the variables and a classification vector selected from a subset of classification vectors $\vec{C}'$ included in the set of classification vectors $\vec{C}$, and perform one of
  (i) determining the transform set from the sub-group of transform sets based on a comparison of the distance and a threshold selected from a subset of thresholds $K_v'$ included in the set of thresholds $K_v$,
  (ii) determining the transform candidate from the sub-group of transform sets based on the comparison of the distance and the threshold, or
  (iii) selecting the transform set from the sub-group of transform sets based on the index in the coded information and determining the transform candidate from the selected transform set based on the comparison of the distance and the threshold.

\* \* \* \* \*